(12) United States Patent
Lampe et al.

(10) Patent No.: US 9,166,657 B2
(45) Date of Patent: Oct. 20, 2015

(54) RADIO FREQUENCY SHIELD WITH PROXIMITY CHANGE ALERT FOR A CONTACTLESS DATA CARRIER

(75) Inventors: Mattias Lampe, Wolfenbuettel (DE); Dan Yu, Beijing (CN); Yong Yuan, Beijing (CN)

(73) Assignee: Siemens Aktiengesellschaft, Munich (DE)

(*) Notice: Subject to any disclaimer, the term of this patent is extended or adjusted under 35 U.S.C. 154(b) by 325 days.

(21) Appl. No.: 13/695,472

(22) PCT Filed: Apr. 8, 2011

(86) PCT No.: PCT/EP2011/055498
§ 371 (c)(1),
(2), (4) Date: Jan. 9, 2013

(87) PCT Pub. No.: WO2011/134772
PCT Pub. Date: Nov. 3, 2011

(65) Prior Publication Data
US 2013/0210356 A1    Aug. 15, 2013

(30) Foreign Application Priority Data
Apr. 30, 2010  (CN) .......................... 2010 1 0163139

(51) Int. Cl.
*H04B 7/00*   (2006.01)
*H04B 7/04*   (2006.01)
*G06K 7/00*   (2006.01)
*G06K 7/10*   (2006.01)

(52) U.S. Cl.
CPC ............ *H04B 7/0404* (2013.01); *G06K 7/0008* (2013.01); *G06K 7/10316* (2013.01)

(58) Field of Classification Search
None
See application file for complete search history.

(56) References Cited

U.S. PATENT DOCUMENTS

| 2006/0220870 | A1 | 10/2006 | Kimura |
| 2006/0267777 | A1* | 11/2006 | Moore ........................ 340/572.8 |
| 2009/0284354 | A1 | 11/2009 | Pinkham |
| 2010/0007471 | A1* | 1/2010 | Takeda et al. ................ 340/10.3 |

FOREIGN PATENT DOCUMENTS

| CN | 1834982 | 9/2006 |
| WO | WO 2008/012856 | 1/2008 |

* cited by examiner

*Primary Examiner* — Edward Urban
*Assistant Examiner* — Mohammed Rachedine
(74) *Attorney, Agent, or Firm* — Cozen O'Connor

(57) ABSTRACT

A device, system, antenna system including a reader and a plurality of antennae, antenna product, method for the addressing antennae, and method for switching the antenna in a radio frequency identification (RFID) system, wherein the method includes switching the reader in a sequential manner to each of the antennae successively according to a radio frequency communication signal from said reader, where the radio frequency communication signal is provided for the reader to communicate with a tag such that it is simple to form a network and easy to implement the network at low cost.

19 Claims, 15 Drawing Sheets

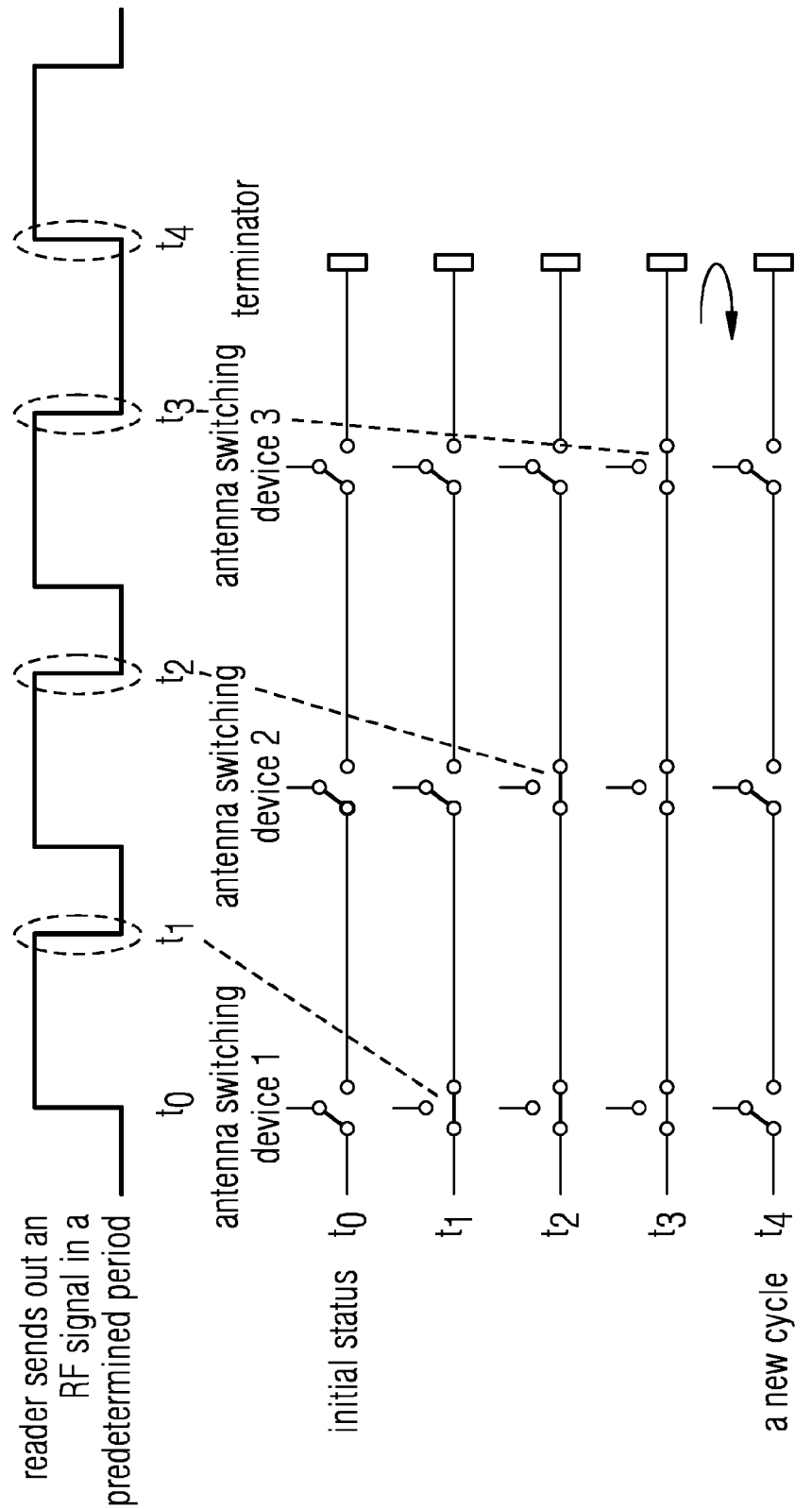

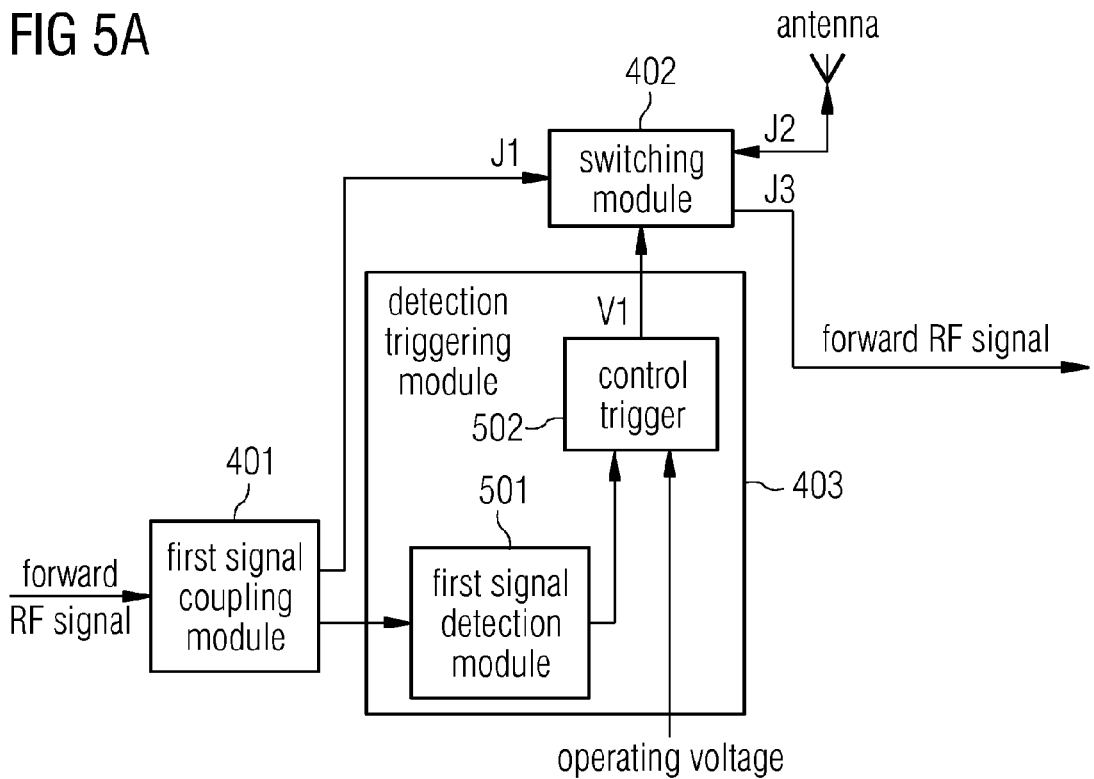
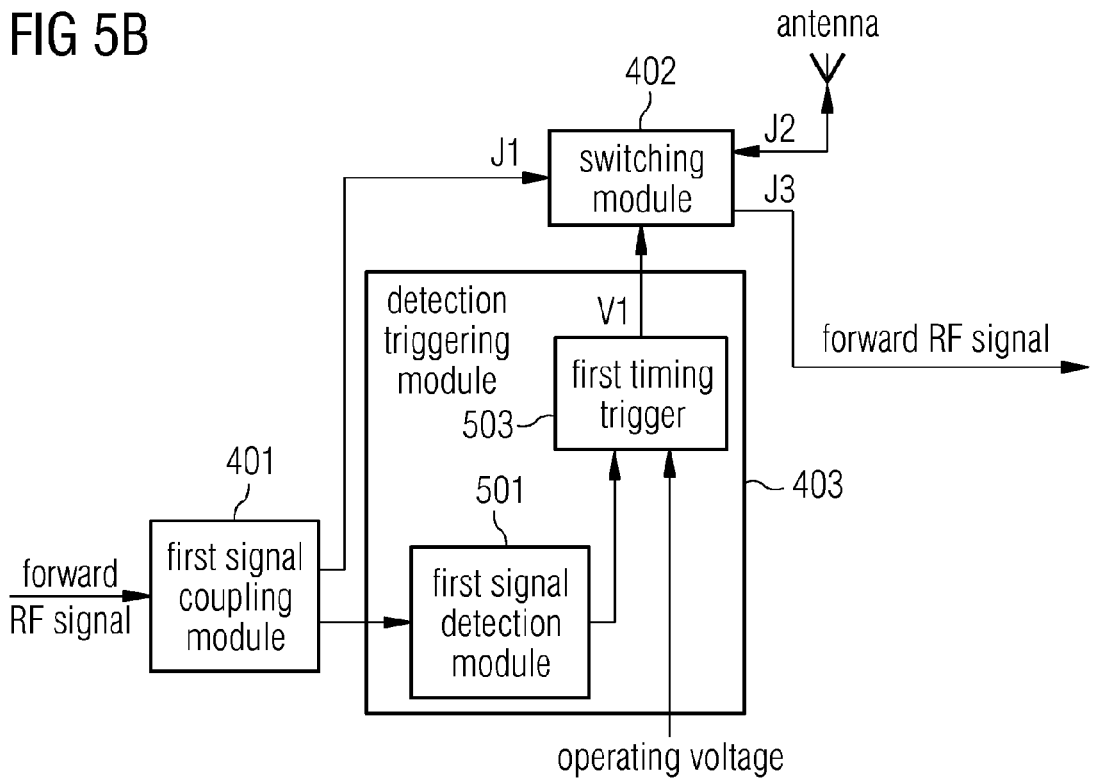

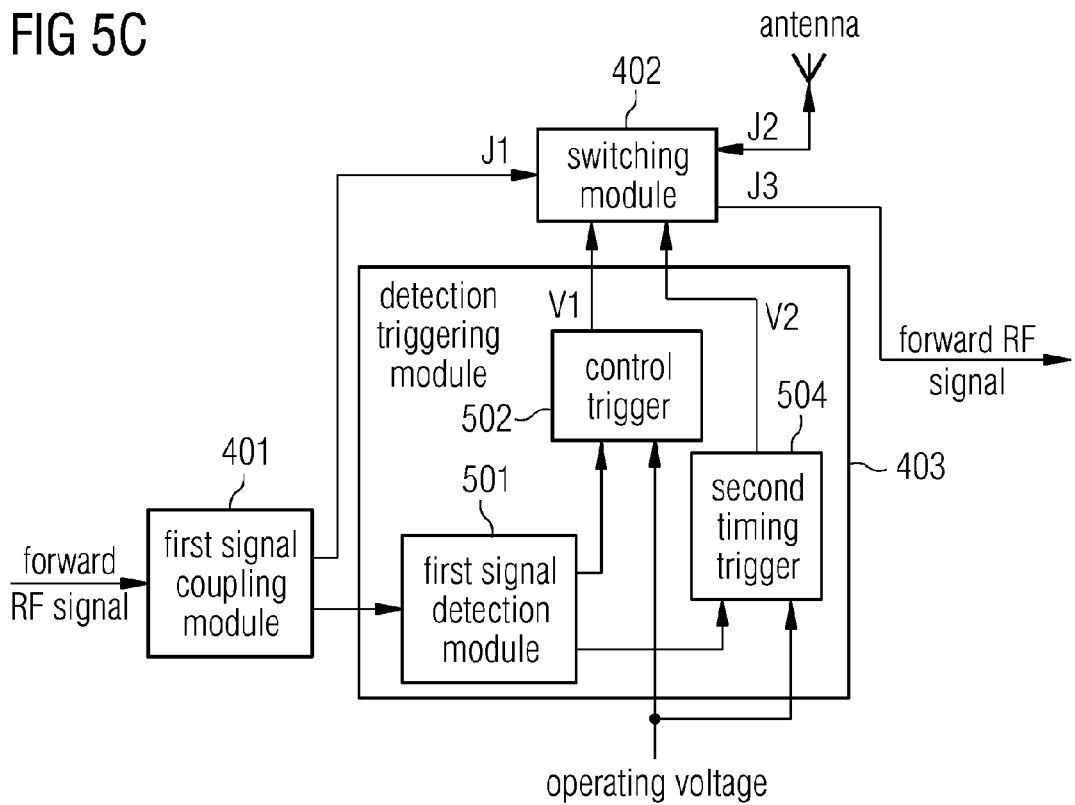
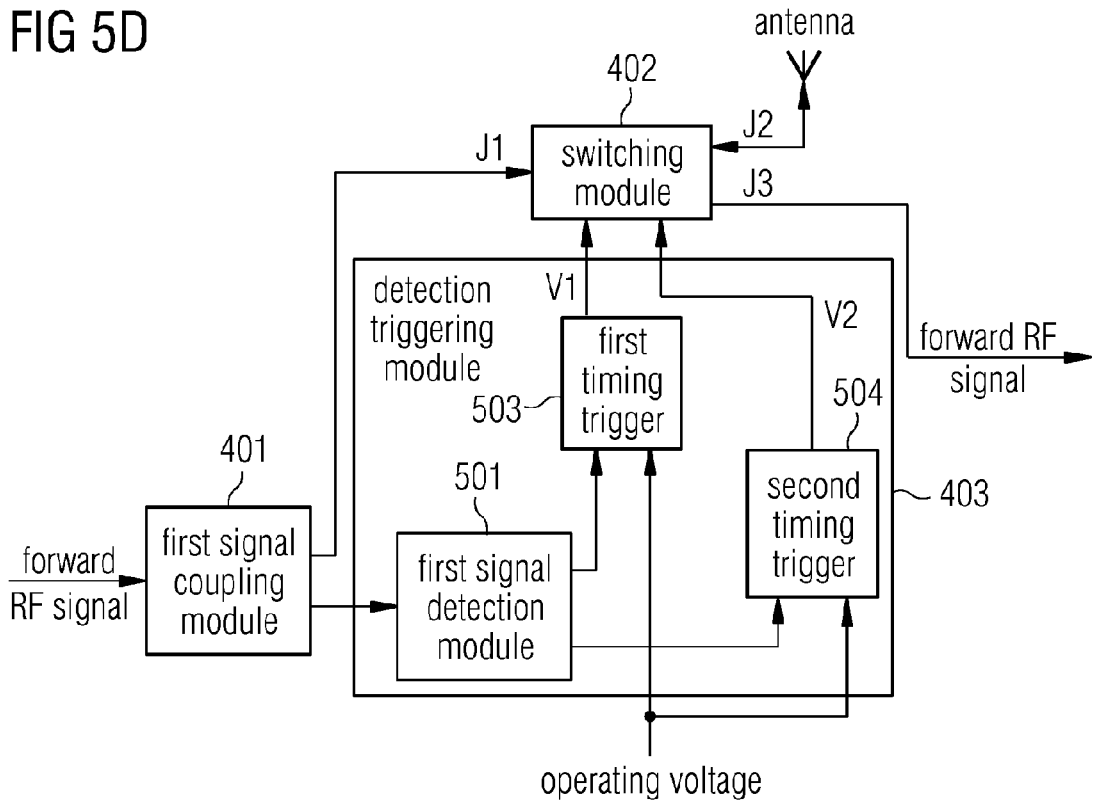

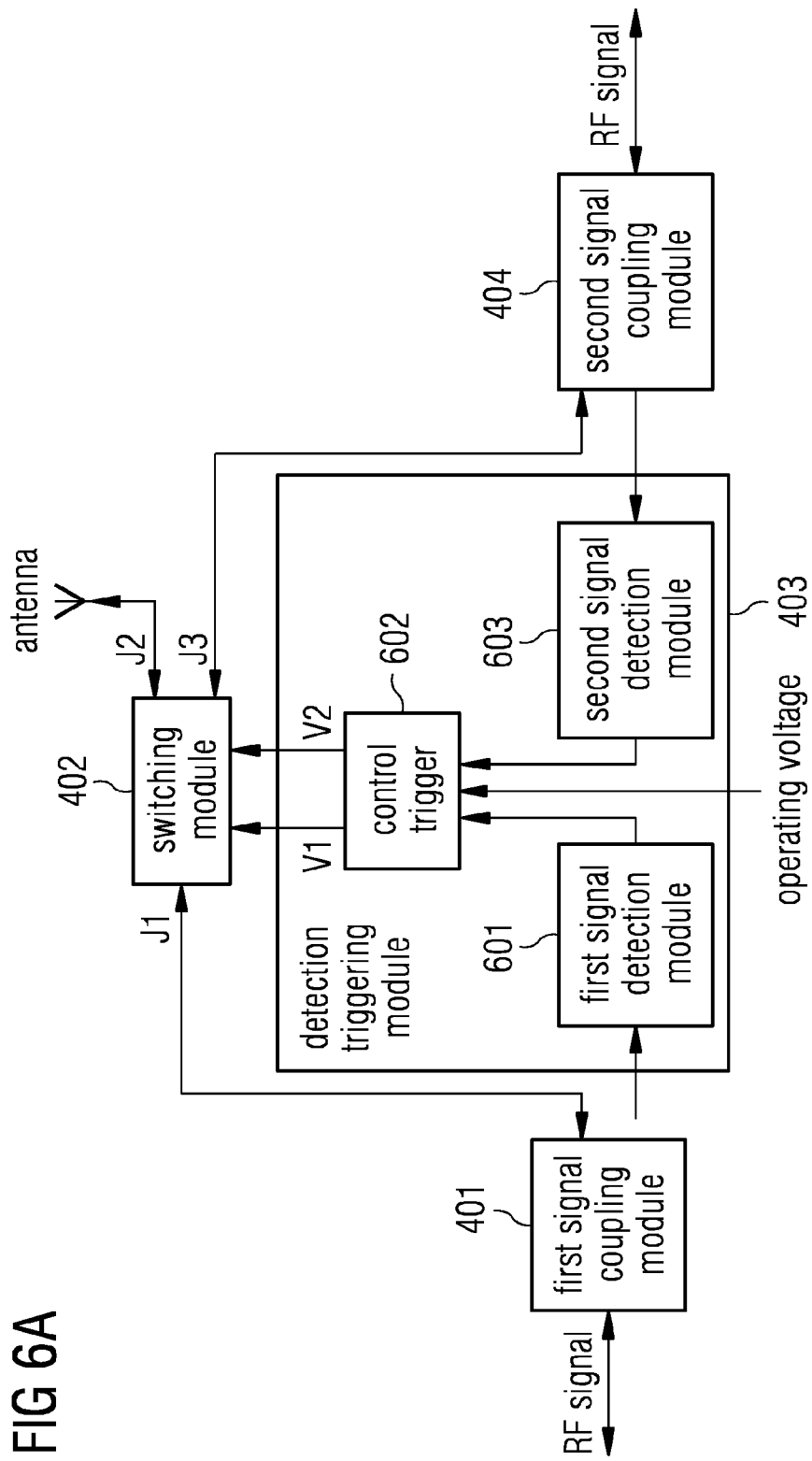

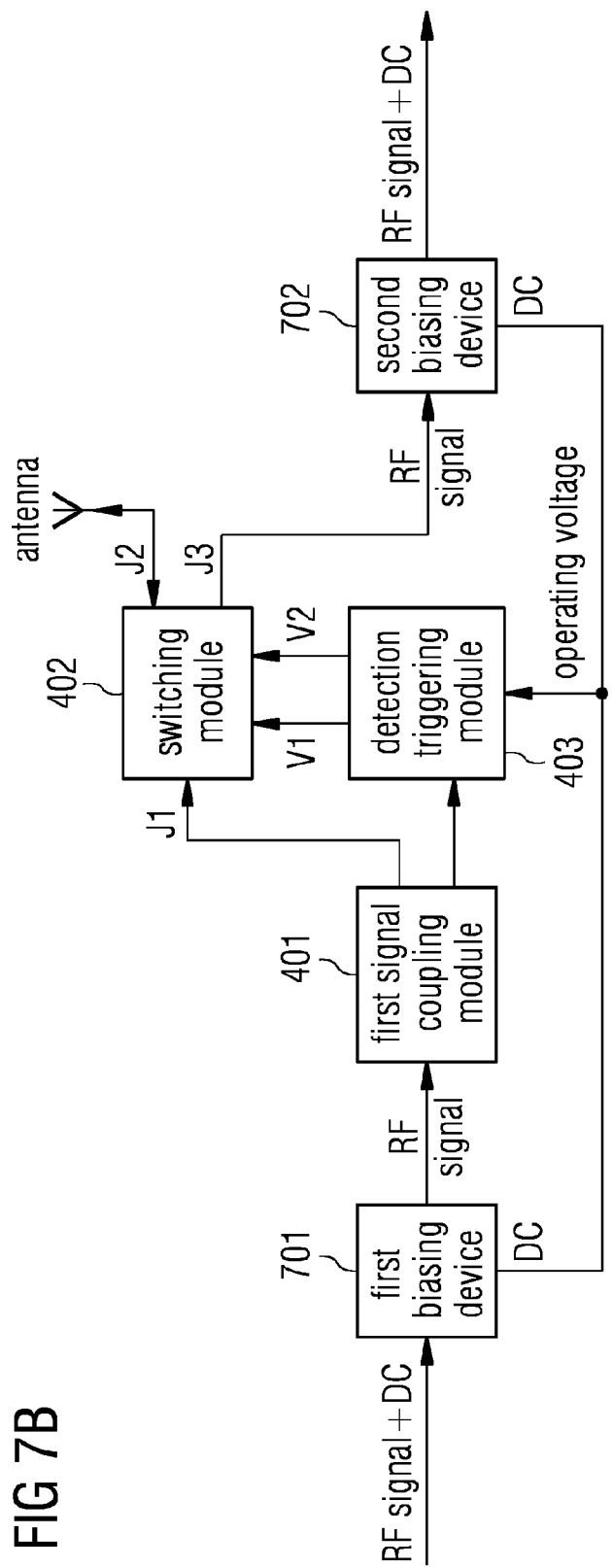

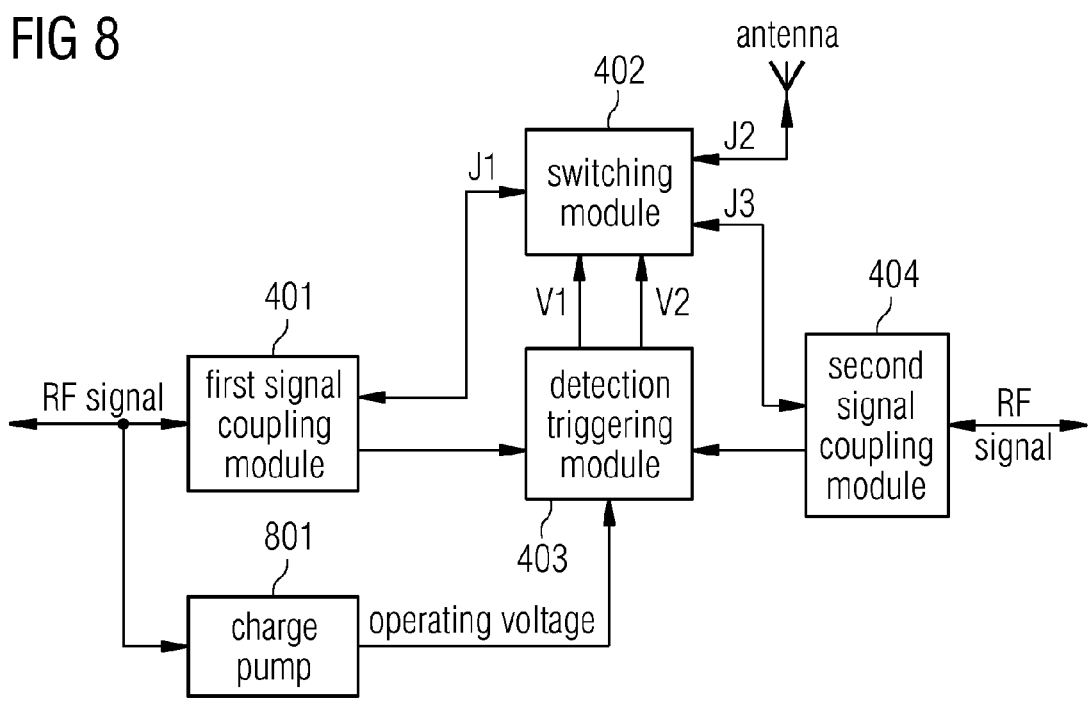

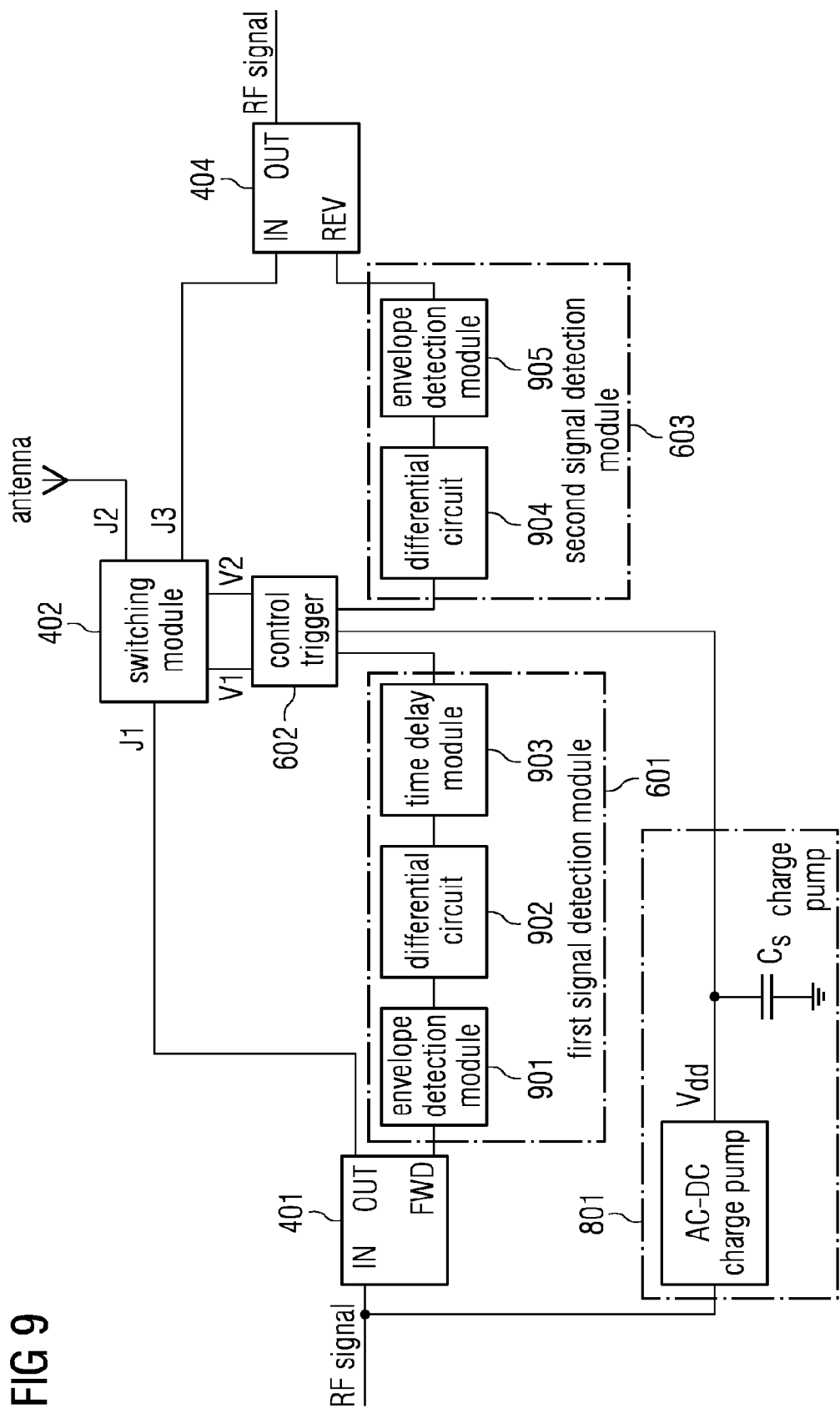

RADIO FREQUENCY SHIELD WITH PROXIMITY CHANGE ALERT FOR A CONTACTLESS DATA CARRIER

CROSS-REFERENCE TO RELATED APPLICATIONS

This is a U.S. national stage of application No. PCT/EP2011/055498 filed 8 Apr. 2011. Priority is claimed on Chinese Application No. 2010 101 631 39.X filed 8 Apr. 30, 2010, the content of which is incorporated herein by reference in its entirety.

BACKGROUND OF THE INVENTION

1. Field of the Invention

The present invention relates to radio frequency identification (RFID) and, more particularly, to a method for switching an antenna, a device for switching an antenna, a system for switching an antenna and a method for addressing antennae in an RFID system, and it further relates to an antenna and an antenna system based on this device for switching the antenna.

2. Description of the Related Art

Radio frequency identification (RFID) technology is a non-contact automatic identification technology, commonly referred to as an electronic tag, which automatically identifies a target object and obtains related data via radio-frequency signals, and the identification operation does not need manual intervention, so it is capable of operating in various harsh environments. RFID technology can identify an item moving at high speed and can identify a plurality of tags simultaneously with rapid and convenient operation.

An RFID system is a wireless system, which is used for controlling, detecting and tracking items, and where the system comprises the following elementary components:
(i). a tag, which is composed of a tag antenna and a chip and is attached to an item to be controlled, detected or tracked, in which case there are generally a plurality of tags included in an RFID system, with each tag having a unique electronic code for uniquely marking the object being controlled, detected or tracked, and the tag can also be referred to herein as a responder;
(ii). a reader, which is used for reading/writing the information stored in the tag and can be hand-held or fixed, in which case there is generally one reader included in an RFID system, which reader reads the information stored in each tag (sometimes it can even write the tag information into a tag) so as to achieve the control, detection or tracking of the item to which a tag is attached, and the reader can also be referred to herein as an interrogator; and
(iii). an antenna, which is disposed on the reader and is used for transmitting a radio-frequency signal between each tag and the reader so as to transmit information between the reader and the tag.

RFID technology is a breakthrough technology, and currently it is increasingly applied in fields such as logistics and supply management, production/manufacture and assembling, airport luggage processing, mail, express parcel processing, document tracking, library management, animal identification tags, sports timing, entrance guard control, electronic tickets and/or highway automatic toll etc. In retail enterprises, it is the RFID-based smart shelves deployment schemes that are closest to the practical business of the enterprises and at the same time most widely accepted by the enterprises.

In the RFID-based smart shelves, a user uses a specially designed RFID reader installed on shelves to obtain the information of the goods placed on the shelves, and performs the work in the application level such as logistics tracking, analysis of the passenger flow and the like on this basis. This deployment scheme is also close in its form to the traditional market plot and can be remolded by the current facilities on a certain basis, thereby becoming the most widely selected scheme during the initial stage of the RFID application.

The RFID-based smart shelves system is mainly suitable for the item-level applications, for example, the scenario of a library, a retail store (such as a supermarket, a DVD shop, a shoe shop, a clothes shop or a pharmacy). However, all of these scenarios need a large number of antennae to cover all the interested reading areas, but the requirement for the real-time response is not high. Therefore, the success of the RFID-based smart shelves is greatly dependent on the design scheme for switching the antennae.

Currently, there is an antenna switching scheme for the RFID-based smart shelves in the industry, which scheme is based on a centralized antennae networking structure. Here, a radio frequency (RF) switch and an RF router are introduced therein and the reader is switched to the antenna deployed on each shelf via the RF switch and RF router. However, such a centralized smart shelves deployment scheme is very difficult to network, the wiring facilities are complicated and the costs are very high.

SUMMARY OF THE INVENTION

It is therefore an object of the present invention to provide a method for switching an antenna, a device for switching an antenna, a system for switching an antenna and a method for addressing antennae in a radio frequency identification (RFID) system, and to provide an antenna system and an antenna based on this device for switching an antenna, so as to achieve the antenna switching in the smart shelves system with simple wiring facilities and low costs in a manner that solves the abovementioned technical problems.

In the method for switching an antenna in the RFID system in accordance with an embodiment of the present invention, the system comprises a reader and a plurality of antennae, the method comprises switching the reader in a sequential manner to each of the antennae successively according to a radio frequency communication signal from the reader, in which, the radio frequency communication signal is provided for the reader to communicate with a tag.

A device for switching an antenna in the RFID system is provided in accordance with embodiment of the present invention, where the system comprises a reader and a plurality of antennae, in which each of the antennae corresponds to one antenna switching device and each of the antenna switching devices is to be connected sequentially to the reader, and each of the antenna switching devices comprises a first signal coupling module, a detection triggering module and a switching module, in which, an initial status of the switching module is that it is connected to its respective antenna and disconnected from a next hop in a forward link, in which case said forward link is in the direction from the reader to the antenna switching device. The first signal coupling module is used for receiving a radio frequency communication signal from a previous hop over the forward link and outputting the radio frequency communication signal to the detection triggering module and the switching module, in which case the radio frequency communication signal is provided for the reader to communicate with a tag. The detection triggering module is used for outputting a first switching instruction to said switching module according to the radio frequency communication signal and the switching module is used for disconnecting from its respective antenna after having received the first switching instruction, connecting to a next hop in the forward link and outputting the radio frequency communication signal to the next hop in the forward link.

A system for switching an antenna in the RFID system provided in accordance with an embodiment of the present invention comprises a reader and a plurality of antennae, in which each of the antennae corresponds to an antenna switching device, a plurality of antenna switching devices are sequentially connected to said reader, and the initial status of said antenna switching device is connecting to its respective antenna; and the antenna switching device is used for receiving a radio frequency communication signal from a previous hop over the forward link, disconnecting from its respective antenna and connecting to a next hop in the forward link according to the radio frequency communication signal, and outputting the radio frequency communication signal to the next hop in the forward link, where the radio frequency communication signal is provided for the reader to communicate with a tag and the forward link is provided in the direction from the reader to the antenna switching device.

In a method for addressing antennae in the RFID system in accordance with an embodiment of the present invention, with the system comprising a reader and a plurality of antennae, the method comprises switching in a sequential manner the reader successively to some or all of the antennae in the plurality of antennae according to a radio frequency communication signal sent out in a predetermined period so as to address one of the antennae therein, where the radio frequency communication signal is provided for the reader to communicate with a tag.

The antenna system in the RFID system in accordance with an embodiment of the present invention comprises an antenna and the above-described antenna switching device.

The above-described antenna switching device is built in the antenna in the RFID system provided in accordance with embodiment of the present invention.

By employing the method for switching an antenna, the system for switching an antenna, the device for switching an antenna in accordance with the disclosed embodiments, the method for addressing antennae and the antenna system and the antennae in the RFID system provided in accordance with the present embodiment of the present invention, the antenna switching in a smart shelves system can be achieved on the basis of a simple networking structure with simple wiring facilities and low costs.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above described and others features and advantages of the present invention will be described in detail hereinbelow for those skilled in the art to understand more clearly by reference to the exemplary embodiments of the present invention in conjunction with the accompanying drawings, in which:

FIG. 3 is a schematic block diagram illustrating the operational principles of an antenna switching system in accordance with an embodiment of the present invention;

FIGS. 5A to 5F are schematic block diagrams of various constructions and structures of the detection triggering modules in an antenna switching device in accordance with an embodiment of the present invention;

FIGS. 6A to 6C are schematic block diagrams of the construction and structure of the detection triggering module in an antenna switching device in accordance with an embodiment of the present invention;

FIGS. 7A and 7B are schematic block diagrams of the construction and structure of an active antenna switching device in accordance with embodiment of the present invention;

FIG. 8 is a schematic block diagram of the construction and structure of a passive antenna switching device in accordance with an embodiment of the present invention;

FIG. 9 is a schematic block diagram of the construction and structure of a passive antenna switching device in accordance with an embodiment of the present invention;

DETAILED DESCRIPTION OF THE PREFERRED EMBODIMENTS

Figure 1:
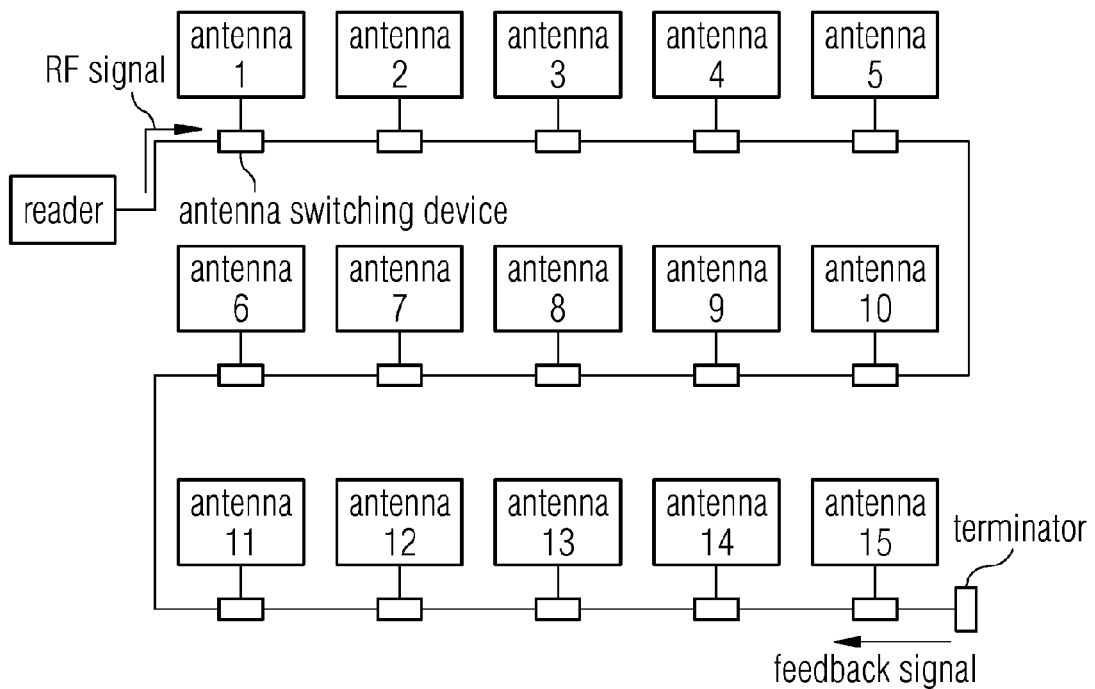
FIG. 1 is a schematic block diagram of the network of an antenna switching system and the switching method thereof in accordance with an embodiment of the present invention.

Hereinbelow, the present invention will be further described in detail in conjunction with the accompanying drawings and the embodiments. It should be understood that the particular embodiments described herein are merely for explaining the present invention, and they are not to be used to limit the present invention.

The present embodiment is directed to a method for switching an antenna in an RFID system, which method is applied in a system comprising a reader and a plurality of antennae. In the present embodiment, at the time of performing antenna switching, a radio frequency communication signal sent out by the reader (i.e., a radio-frequency signal sent out by the reader when it communicates with a tag) can be used and without the need to rely on a special digital control signal, and the reader can be successively switched to each of the antennae in a sequential manner according to this radio frequency communication signal.

In this case, the radio frequency communication signal sent out by the reader can be sent out in a predetermined period or can be sent out continuously, and in both cases the method of switching the reader in a sequential manner to each of the antennae successively is as follows:

1. When the radio frequency communication signal is sent out in a predetermined period, the reader can be successively switched to each of the antennae under the triggering of this periodical radio frequency communication signal. Here, the reader can be switched to a next one of the antennae during each period. For example, there are in total three antennae sequentially connected in the system: an antenna 1, an antenna 2, and an antenna 3, in which the reader is initially connected to antenna 1, and for the reader to be successively switched to antenna 2 and the antenna 3, the reader can be switched to antenna 2 during a first transmission period and the reader can be switched to the antenna 3 during a second period. When the signal is sent out periodically, there will be several pairs of up edges and down edges in the signal waveform, so that the start point and the end point of the transmission period of the radio frequency communication signal can be detected by detecting an up edge and a down edge of the radio frequency communication signal, thereby achieving the switching of the reader to the next antenna during the transmission period of each radio frequency communication signal. In the presently contemplated embodiment of the present invention, the reader can be switched to the next antenna when a down edge or an up edge of the radio frequency communication signal is detected.

2. When the radio frequency communication signal is sent out continuously or sent out in a predetermined period, the reader can be switched to a next one of the antennae every once in a while by setting a timer. Particularly, the treatment regarding each of the antennae comprises starting a first timer when an antenna or an antenna switching device corresponding to the antenna detects a radio frequency communication signal, and switching the reader to a next one of the antennae when the first timer is timed out. Such a switching method by setting a timer does not limit the way for the transmission of the radio frequency communication signal, and this method can be employed either for the radio frequency communication signals sent out continuously or the one sent out periodically. In this case, the method for detecting a radio frequency communication signal can be as follows: detecting whether the strength of the radio frequency communication signal meets a predetermined condition (for example, with the power, or the amplitude of the radio frequency communication signal reaching predetermined thresholds), and when the detected strength of the radio frequency communication signal meets the predetermined condition, it is considered that a radio frequency communication signal has been detected.

Furthermore, when the reader is switched to the last antenna (for example, the antenna 3 in the abovementioned example), after the system needs to reset to the initial status (i.e. the reader is re-switched to the first antenna), the reader can be continuously switched in a sequential manner to each of the antennae successively. In this case, the methods for achieving this reset are as follows:

1. Achieving the reset according to a feedback signal of the radio frequency communication signal.

Here, the last antenna is connected to a terminator, and this terminator reflects the radio frequency communication signal to form a feedback signal. The reader can be re-switched to the first antenna (i.e., the antenna adjacent to the reader, such as antenna 1 in the abovementioned example) according to the feedback signal from the terminator.

2. Achieving the reset by setting a timer

Particularly, the treatment regarding each of the antennae comprises presetting a second timer, which can be started at a time when the antenna or the antenna switching device corresponding to the antenna detects a radio frequency communication signal or when the antenna switching device is disconnected from its respective antenna, and which resets the initial status when it is timed out. The reader is then re-switched to the antenna adjacent to the reader so as to continuously switch the reader in a sequential manner to each of the antennae successively after having waited for a time period.

In this case, the method for the reader to be switched again to the first antenna according to the feedback signal is as follows:

1. When the radio frequency communication signal is sent out in a predetermined period, the start point and the end point of the feedback signal can be detected by detecting an up edge and a down edge of the feedback signal. In presently contemplated embodiment of the invention, the reader can be re-switched to the antenna adjacent thereto (i.e., the first antenna) at the time when the up edge or the down edge of the feedback signal is detected.

2. When the radio frequency communication signal is sent out in a predetermined period or sent out continuously, the reader can be re-switched to the antenna adjacent thereto at the time when the feedback signal is detected. In this case, the method for detecting the feedback signal can be as follows: detecting whether the strength of the feedback signal meets a predetermined condition (for example, with the power or the amplitude of the feedback signal reaching predetermined thresholds), and when the detected strength of the feedback signal meets the predetermined condition, it is considered that a feedback signal is detected.

Furthermore, in accordance with embodiments of the present invention, an antenna switching path can be further configured. The so-called antenna switching path refers to a path formed by a plurality of antennae involved in the sequential switching, and an antenna switching path may comprise some or all of the antennae in the whole system. Here, the antenna switching device may be built in the antenna or it may also be an independent one outside the antenna. Based on the abovementioned method for switching an antenna, the contemplated embodiment of the present invention proposes a system for switching an antenna, which system comprises a reader and a plurality of antennae. In this case, each of the antennae corresponds to an antenna switching device, the plurality of antenna switching devices corresponding to these antennae are to be sequentially connected to the reader, and all the initial statuses of these antenna switching device are that they are connected to their respective antenna and disconnected from a next hop in a forward link. Here, the antenna switching device may be independent from its respective antenna and may also be built in its respective antenna.

In the abovementioned antenna switching system, each antenna switching device is used for receiving a radio frequency communication signal from a previous hop over a forward link, disconnecting from its respective antenna according to this radio frequency communication signal, and outputting this radio frequency communication signal to a next hop in this forward link, where the radio frequency communication signal is a radio-frequency signal sent out by the reader for it to communicate with a tag, and the forward link refers to a link in the direction from the reader to the antenna switching device, so that the previous hop of the forward link may refer to the reader or another antenna switching device.

In this antenna switching system, when the reader is switched to the last antenna (i.e., the antenna of the last hop over the forward link), each antenna switching device can wait for a time period and then reset to the initial status, and at this moment, the reader will be re-switched to the first antenna (i.e., the antenna of the first hop over the forward link). The reader will subsequently go on to be successively switched to each of the antennae. In this case, the antenna switching device may be provided with a timer, which can be started at the time when the antenna switching device detects a radio frequency communication signal or at the time when the antenna switching device is disconnected from its respective antenna, and the antenna switching device can reset to the initial status when this timer is timed out, so that when the reader is switched to the last antenna and after a time period, each antenna switching device can reset to the initial status so as to switch the reader again to the first antenna.

Alternatively, this antenna switching system can further comprise a terminator, which is connected to the antenna switching device corresponding to the last antenna, i.e., each antenna switching device is sequentially connected between the reader and this terminator. Under this circumstance, after the reader has been switched to the last antenna, the reader is switched to this terminator, which reflects the radio frequency communication signal and forms a feedback signal at the time when it receives the radio frequency communication signal from the previous hop (i.e., the antenna switching device corresponding to the last antenna) over the forward link, and the feedback signal is transmitted to the next hop of a backward link (i.e. the antenna switching device corresponding to the last antenna). Here, the backward link refers to a link in the direction from the terminator to the antenna switching device. Each antenna switching device is connected to its respective antenna according to the feedback signal when it receives the feedback signal from a previous hop (it may be a terminator or another antenna switching device) over the backward link and outputs the feedback signal to a next hop (it may be a reader or another antenna switching device) in the backward link. In this way, after the reader has been switched to the last antenna, each antenna switching device can be reset to the initial status according to the feedback signal from the terminator so as to switch the reader again to the first antenna.

In the abovementioned embodiments of the antenna switching system, when a radio frequency communication signal is sent out in a predetermined period and sent out continuously, the switching methods of the antenna switching device are as follows:
1. When the radio frequency communication signal is sent out in a predetermined period, the antenna switching device disconnects from its respective antenna and connects to the next hop in the forward link when it detects a down edge or an up edge of the radio frequency communication signal and outputs the radio frequency communication signal to the next hop in the forward link.
2. When the radio frequency communication signal is sent out in a predetermined period or sent out continuously, the antenna switching device starts a first timer when detecting a down edge or an up edge of the radio frequency communication signal, disconnects from its respective antenna and connects to the next hop in the forward link when the first timer is timeout, and outputs the radio frequency communication signal to the next hop in the forward link.

In the abovementioned embodiments of the antenna switching system, when the radio frequency communication signal is sent out in a predetermined period and sent out continuously, the resetting methods of the antenna switching device are as follows:
1. When the radio frequency communication signal is sent out in a predetermined period, the antenna switching device connects to its respective antenna and disconnects from the previous hop in the backward link when it detects an up edge or a down edge of the feedback signal and outputs the feedback signal to the next hop in the backward link.
2. When the radio frequency communication signal is sent out in a predetermined period or sent out continuously, the antenna switching device connects to its respective antenna and disconnects from the previous hop in the backward link when it detects a feedback signal and outputs the feedback signal to the next hop in the backward link.

The several switching methods and resetting methods of the antenna switching device mentioned above can be combined in any way to achieve the complete switching/resetting procedure.

FIG. 1 is a schematic block diagram of the network of an antenna switching system and the switching method thereof in accordance with an embodiment of the present invention. As shown in FIG. 1, this antenna switching system comprises a reader, fifteen antennae and their respective antenna switching devices and a terminator. In this case, each antenna switching device is sequentially connected between the reader and the terminator in a predetermined order and the initial status of each antenna switching device is that it is connected to their respective antenna. It needs to be noted that in the initial status, the connection between each antenna switching device is disconnected, while the reader and the antenna switching device corresponding to antenna 1 are connected, therefore the reader is connected with antenna 1 in the initial status; when making antenna switching, the reader sends out a radio frequency communication signal (it is an RF signal in this embodiment) to the antenna switching device corresponding to antenna 1, and the antenna switching device corresponding to antenna 1 disconnects from antenna 1 after it receives this RF signal and sends this RF signal to the next hop in the forward link (i.e., the antenna switching device corresponding to antenna 2), so that the reader is connected with antenna 2 and disconnects from antenna 1, i.e., it is switched from antenna 1 to antenna 2. This is repeated until the reader is switched to antenna 15, while antenna 1 to antennae 14 have all disconnected from their respective antenna switching devices, and at this moment, the antenna switching device corresponding to antenna 15 will disconnect from antenna 15 and send the RF signal to the terminator, i.e., it is switched from antenna 15 to the terminator. The terminator reflects the RF signal after having received the RF signal and forms a feedback signal, and this feedback signal is transmitted to the antenna switching device corresponding to antenna 15 along the backward link.

According to the abovementioned working principles of the antenna switching device, it can be seen that when the reader is switched to the terminator, all the antenna switching devices are connected in a sequential manner, and therefore the feedback signal can be sent to the reader successively through the antenna switching device corresponding to antenna 15, the antenna switching device corresponding to antenna 14, the antenna switching device corresponding to antenna 13, . . . , the antenna switching device corresponding to the antenna 3, the antenna switching device corresponding to antenna 2, and the antenna switching device corresponding to antenna 1, where antenna switching device will also connect to its respective antenna when it receives the feedback signal, i.e., recovers to its initial status. Apparently, when the feedback signal is transmitted from the terminator to the reader, the entire antenna switching system recovers to the initial status that each antenna switching device is connected with its respective antenna but each antenna switching device is not connected with each other, and the reader is connected with antenna 1, i.e., the reader is re-switched again to antenna 1, and afterwards the reader can go on to be switched in a sequential manner to each of the antennae successively according to an RF signal.

In the abovementioned embodiments of the present invention, each antenna switching device corresponding to the antenna to which the reader once switched (i.e., the antenna switching device involved in the sequential switching) constitutes a path, which can be referred to as an antenna switching path. This antenna switching path can be a static path pre-configured and can also be a path dynamically configured. Under certain circumstances, many antennae can be included in the entire system, and the antenna switching devices corresponding to these antennae may be deployed not as one path as shown in FIG. 1, for example, but may be deployed into a grid structure. Under this situation, before performing the antenna switching, it is possible for some of the antenna switching devices to be designated manually or automatically as required as the ones currently waiting for the antenna switching. These antenna switching devices and the reader constitute an antenna switching path and, afterwards, according to the abovementioned principles of the antenna switching, the reader will be switched in a sequential manner to an antenna corresponding to each antenna switching device successively in this antenna switching path starting from one end of this antenna switching path. The particular principles of the switching are the same as described previously, which will not be repeated here.

Figure 2:
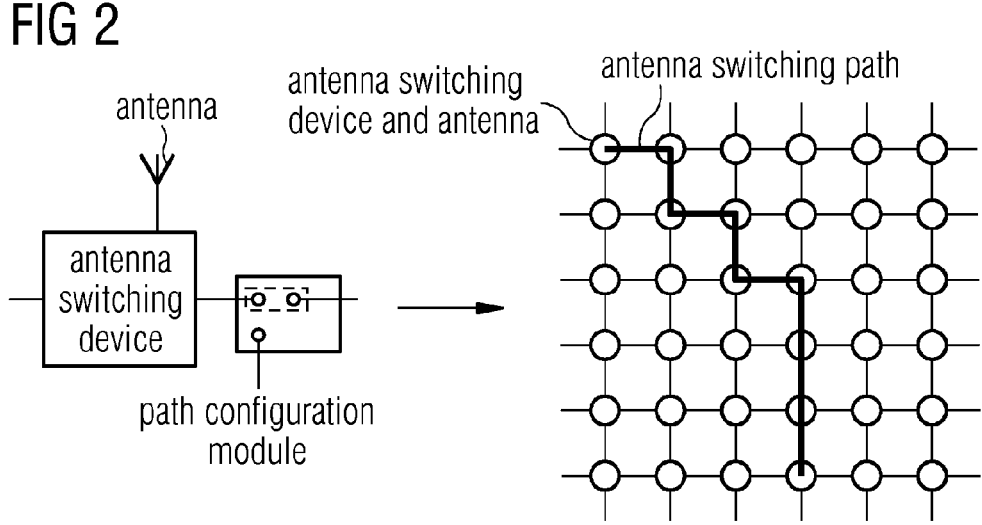
FIG. 2 is a schematic block diagram illustration of the configuration of an antenna switching path in accordance with to an embodiment of the present invention.

FIG. 2 is a schematic block diagram illustrating the configuration of an antenna switching path in accordance with an embodiment of the present invention. The right-hand half of FIG. 2 shows the grid networking structure constituted by these antenna switching devices, and the left-hand half of FIG. 2 shows that the antenna switching device accepts the configuration from a path configuration module and is designated as a node in the antenna switching path, where a trigger may be built in the antenna switching device. When the antenna switching device is configured as a node in the antenna switching path, this trigger can activate the switch function of the antenna switching device in the abovementioned embodiments, and it then joins the antenna switching procedure. In other cases, the switch function of the antenna switching device is not activated and it will not join the antenna switching procedure.

FIG. 3 is a schematic block diagram of the operational principle of an antenna switching system in accordance this embodiment of the present invention. In this embodiment, there are in total three antennae in the system, with each of them corresponding to antenna switching device 1, antenna switching device 2 and antenna switching device 3, respectively. The reader sends out an RF signal in a predetermined period to control the switching of the antennae and detects the down edge of the RF signal when performing a switching, and the terminator reflects the RF signal and forms a feedback signal, and detects the up edge of the feedback signal after the reader has been switched to the last antenna. As shown in FIG. 3, the whole switching procedure is as follows:

1. At time $t_0$ (the initial status), antenna switching devices 1, 2 and 3 are each connected to their respective antennae and are disconnected from the next hop in the forward link.

2. At time $t_1$, antenna switching device 1 detects a down edge of the RF signal, then it disconnects from its respective antenna, connects to the next hop in the forward link, and sends the RF signal to the next hop, and at this moment, as shown in FIG. 3, the reader has been connected to antenna switching device 2, i.e., it is switched from the antenna corresponding to antenna switching device 1 to the antenna corresponding to antenna switching device 2.

3. At time $t_2$, antenna switching device 2 detects a down edge of the RF signal, then it disconnects from its respective antenna, connects to the next hop in the forward link, and sends the RF signal to the next hop, and at this moment, as shown in FIG. 3, the reader has been connected to antenna switching device 3, i.e. it is switched from the antenna corresponding to antenna switching device 2 to the antenna corresponding to antenna switching device 3.

4. At time $t_3$, antenna switching device 3 detects a down edge of the RF signal, then it disconnects from its respective antenna, connects to the next hop in the forward link, and sends the RF signal to the next hop, and at this moment, as shown in FIG. 3, the reader has been connected to the terminator, i.e., it is switched from the antenna corresponding to antenna switching device 3 to the terminator. Next, the terminator reflects a feedback signal to the backward link, and at this moment, antenna switching devices 1, 2 and 3 are connected.

5. Antenna switching devices 1, 2 and 3 detect an up edge of the feedback signal at time $t_4$, and recover to the initial status, i.e., all of them connect to their respective antennae and disconnect from the next hop in the forward link.

Then, a new cycle starts, and the reader will be successively switched to each of the other antennae starting from the antenna corresponding to antenna switching device 1.

Based on the method and the system for switching an antenna provided by the abovementioned embodiments of the present invention, this embodiment of the present invention further provides an antenna switching device, the particular construction and structure and the implementing principles thereof are described below.

Figure 4A:
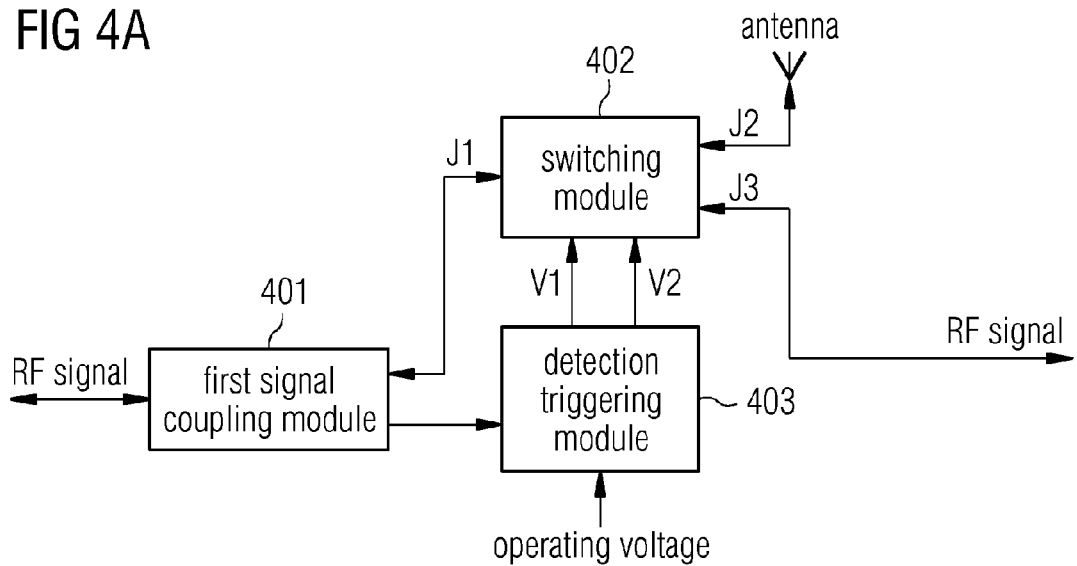
FIGS. 4A and 4B are schematic block diagrams of exemplary constructions and structures of antenna switching devices in accordance with an embodiment of the present invention.

FIG. 4A is a schematic block diagram of the construction and structure of an antenna switching device in accordance with an embodiment of the present invention. As shown in FIG. 4A, the antenna switching device in this RFID system comprises a first signal coupling module 401, a detection triggering module 403, and a switching module 402, where the initial status of the switching module 402 is that it is connected to its respective antenna (i.e., J1 and J2 ends are connected) and disconnected from the next hop in the forward link (i.e., J1 and J3 ends are disconnected).

When performing antenna switching, the operational principles of each module are as follows:

1. The first signal coupling module 401 receives an RF signal from a previous hop in the forward link and outputs the RF signal to the detection triggering module 403 and the switching module 402. In this case, the RF signal is a radio frequency communication signal sent out by the reader.

2. The detection triggering module 403 outputs a first switching instruction to the switching module 402 according to the RF signal received, for example, setting $V1=V_{dd}$, V=gnd.

3. The switching module 402 disconnects from its respective antenna (i.e., J1 and J2 ends are disconnected) when it receives the first switching instruction (for example, when $V1=V_{dd}$), connects to the next hop in the forward link (i.e., J1 and J3 ends are connected), and outputs the RF signal to the next hop in the forward link.

In this way, the reader is switched to the next antenna (i.e., the antenna correspondingly connected to the next hop in the forward link).

In the antenna switching device shown in FIG. 4A, when the radio frequency communication signal is sent out in a predetermined period, as shown in FIG. 5A, the detection triggering module 403 can comprise: a first signal detection module 501 and a control trigger 502. In this case, the first signal detection module 501 is used for detecting a down edge or an up edge of the radio frequency communication signal and triggering the control trigger 502 when detecting the down edge or the up edge of the radio frequency communication signal, and the control trigger 502 is used for sending a first switching instruction to the switching module 402 when it is triggered by the first signal detection module 501.

In the antenna switching device shown in FIG. 4A, when the radio frequency communication signal is sent out in a predetermined period or sent out continuously, as shown in FIG. 5B, the detection triggering module 403 can comprise: a first signal detection module 501 and a first timing trigger 503. In this case, the first signal detection module 501 is used for triggering the first timing trigger 503 when detecting the radio frequency communication signal from the forward link, and the first timing trigger 503 is used for starting a first timer when it is triggered by the first signal detection module 501 and outputting a first switching instruction to the switching module 402 when the first timer has timed out.

In this case as shown in FIGS. 5C and 5D, the detection triggering modules 403 shown in FIGS. 5A and 5B can both further comprise: a second timing trigger 504. In this case, the first signal detection module 501 is further used for triggering the second timing trigger 504 when detecting the radio frequency communication signal from the forward link; the second timing trigger 504 is further used for starting a second timer when it is triggered by the first signal detection module 501 and outputting a second switching instruction to the switching module when the second timer has timed out, and the switching module 402 is further used for resetting to the initial status when it receives the second switching instruction.

Figure 5E:
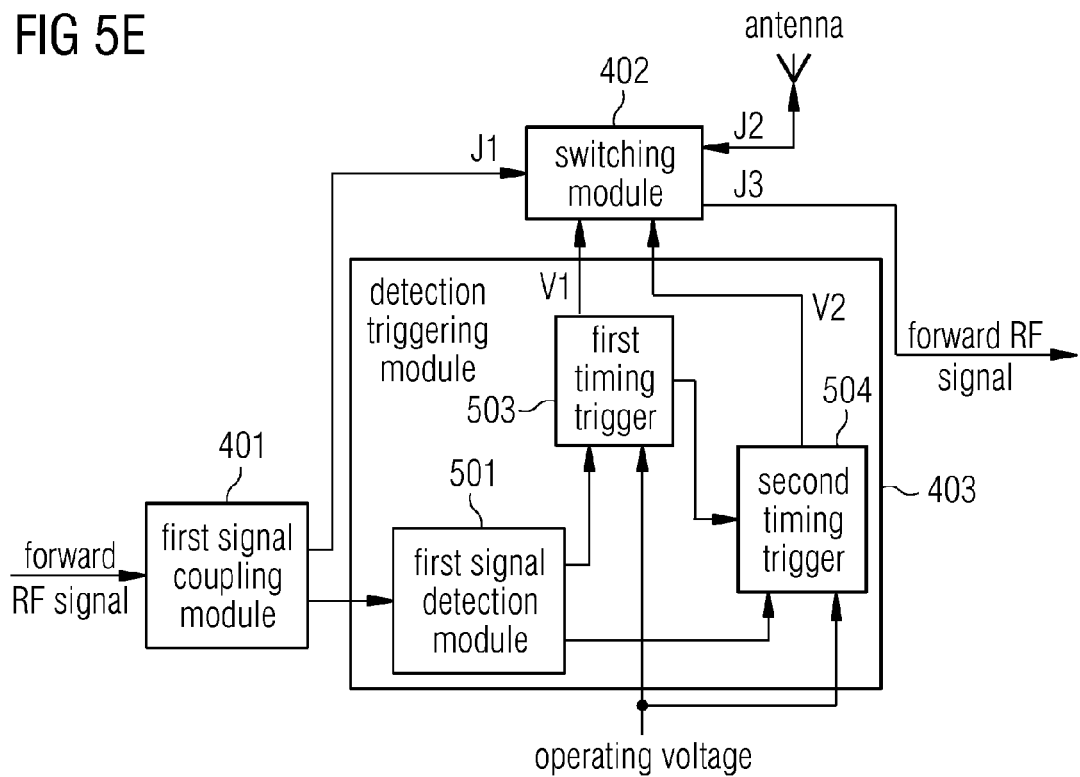

Furthermore, as shown in FIG. 5E, when the detection triggering module 403 as shown in FIG. 5B comprises the first signal detection module 501, the first timing trigger 503 and the second timing trigger 504, its operational principles can also be as follows:

The first signal detection module 501 is used for triggering the first timing trigger 503 when detecting the radio frequency communication signal from the forward link, the first timing trigger 503 is used for starting a first timer when it is triggered by the first signal detection module 501 and outputting a first switching instruction to the switching module 402 when the first timer has timed out and at the same time triggering the second timing trigger 504; the second timing trigger 504 is further used for starting a second timer when it is triggered by the first signal detection module 501 and outputting a second switching instruction to the switching module when the second timer has timed out, and the switching module 402 is further used for resetting to the initial status when it receives the second switching instruction.

Figure 5F:
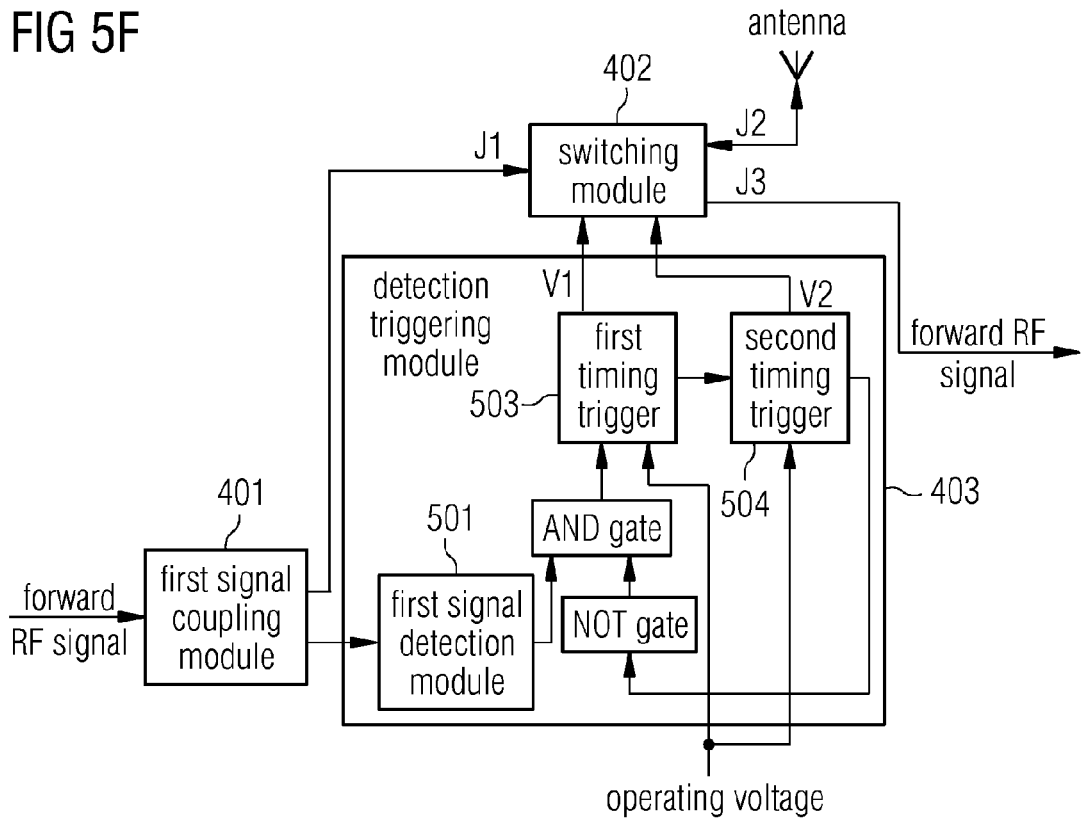

Particularly, the detection triggering module 403 shown in FIG. 5E can be further implemented as a circuit structure shown in FIG. 5F. As shown in FIG. 5F, it is assumed that the initial status of the switching module 402 is that J2 is connected to J1, the default outputs of the second timing trigger 504 and the first timing trigger 503 are both low voltages, and the timer counts by the high voltage triggering, and the first signal detection module 501 is used for detecting the voltage value of a forward RF signal. The operational principles of the detection triggering module 403 are as follows:

When the first signal detection module 501 detects the forward RF signal as a high voltage, it will trigger the first timing trigger 503 to start the first timer to count (assuming that the initial value of the first timer is T1). After T1 (the first timer having timed out), the first timing trigger 503 controls the switching module 402 via VI so as to connect J3 to J1, and at the same time outputs a high voltage to the second timing trigger 504 so as to trigger it to start the second timer to count. Within T1, the antenna connected to the switching module 402 can receive a forward RF signal from a previous hop in the forward link and then communicate with a tag. After T1, the switching module 402 will be connected to the antenna switching device of the next hop over the forward link and then the reader will be switched to the antenna connected to the antenna switching device of the next hop.

The second timing trigger 504 cause the second timer to start counting when it is triggered, and when the counting begins, the output of the second timing trigger 504 changes to a high voltage. In this case, it is assumed that the initial value of the second timer is set to be T2 (T2>>T1 in the practical applications). After $T_2$, the second timing trigger 504 controls the switching module 402 via V2 to connect J2 to J1, and at the same time its output changes to a low voltage that is output to an NOT gate. At this moment, the antenna switching device will reset to the initial status, i.e., it connects to its respective antenna per se and disconnects from the next hop in the forward link. When the first signal detection module again detects a high voltage, the abovementioned switching process will be repeated and a new cycle of switching then starts.

Figure 4B:
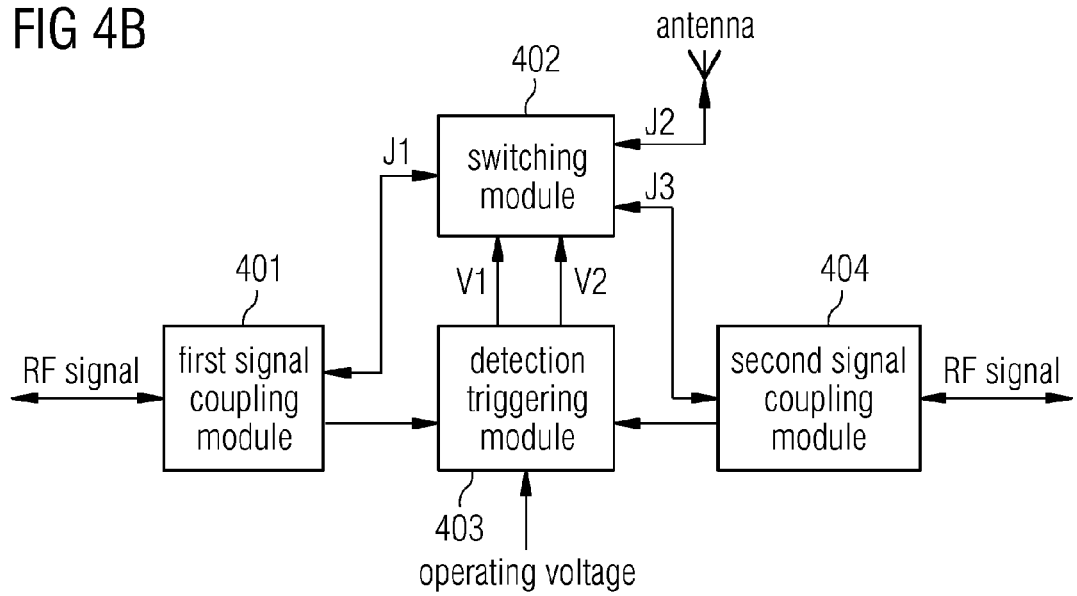

FIG. 4B is a schematic block diagram of the construction and structure of an antenna switching device in accordance with an embodiment of the present invention. As shown in FIG. 4B, the antenna switching device in the RFID system comprises a first signal coupling module 401, a detection triggering module 403, a switching module 402 and a second signal coupling module 404, in which the initial status of the switching module 402 is that it connects to its respective antenna (i.e., J1 and J2 ends are connected) and disconnects from the next hop in the forward link (i.e., J1 and J3 ends are disconnected).

When performing antenna switching, the operational principles of the modules are as follows:

1. The first signal coupling module 401 receives an RF signal from a previous hop over the forward link and outputs the RF signal to the detection triggering module 403 and the switching module 402. The RF signal is a radio frequency communication signal sent out by the reader.

2. The detection triggering module 403 outputs a first switching instruction to the switching module 402 according to the RF signal received, for example, setting V1=$V_{dd}$, V2=gnd.

3. The switching module 402 disconnects from its respective antenna (i.e., J1 and J2 ends are disconnected) when it receives the first switching instruction (for example, when V1=$V_{dd}$), connects to the second signal coupling module 404 (i.e., J1 and J3 ends are connected), and outputs the RF signal to the next hop in the forward link via the second signal coupling module 404.

In this way, the reader is switched to the next antenna (i.e., the antenna correspondingly connected to the next hop in the forward link).

When the RF signal is sent to the terminator connected to the antenna switching device that is connected to the last hop in the forward link, the terminator reflects the RF signal and forms a feedback signal and resets to the initial status using this feedback signal, and its particular resetting process is as follows:

1. The second signal coupling module 404 receives the feedback signal from a previous hop over the backward link and outputs it to the detection triggering module 403 and the switching module 402.

2. The detection triggering module 403 further outputs a second switching instruction (for example, when V1=$V_{dd}$) to the switching module 402 according to the feedback signal.

3. The switching module 402 further outputs the feedback signal to the first signal coupling module 401, and connects to its respective antenna (i.e., J1 and J2 ends are connected) when it receives the second switching instruction and disconnects from the second signal coupling module 404 (i.e., J1 and J3 ends are disconnected).

4. The first signal coupling module 401 outputs the feedback signal to a next hop in the backward link.

In the antenna switching device shown in FIG. 4B, when the radio frequency communication signal is sent out in a predetermined period, as shown in FIG. 6A, the detection triggering module 403 can comprise a first signal detection module 601, a second signal detection module 603 and a control trigger 602. In the present embodiment, the first signal detection module 601 is used for detecting a down edge or an up edge of an RF signal and for triggering the control trigger 602 when detecting the down edge or the up edge of the RF signal; the second signal detection module 603 is used for detecting an up edge or a down edge of a feedback signal from the backward link and triggering the control trigger 602 when detecting the up edge or the down edge of the feedback signal from the backward link, and the control trigger 602 is used for sending a first switching instruction to the switching module 402 when it is triggered by the first signal detection module 601 and sends a second switching instruction to the switching module 402 when it is triggered by the second signal detection module 603. Optionally, the second signal detection module 603 can further be used for triggering the control trigger 602 or directly outputting the second switching instruction to the switching module 402 when detecting the feedback signal from the backward link.

Figure 6B:
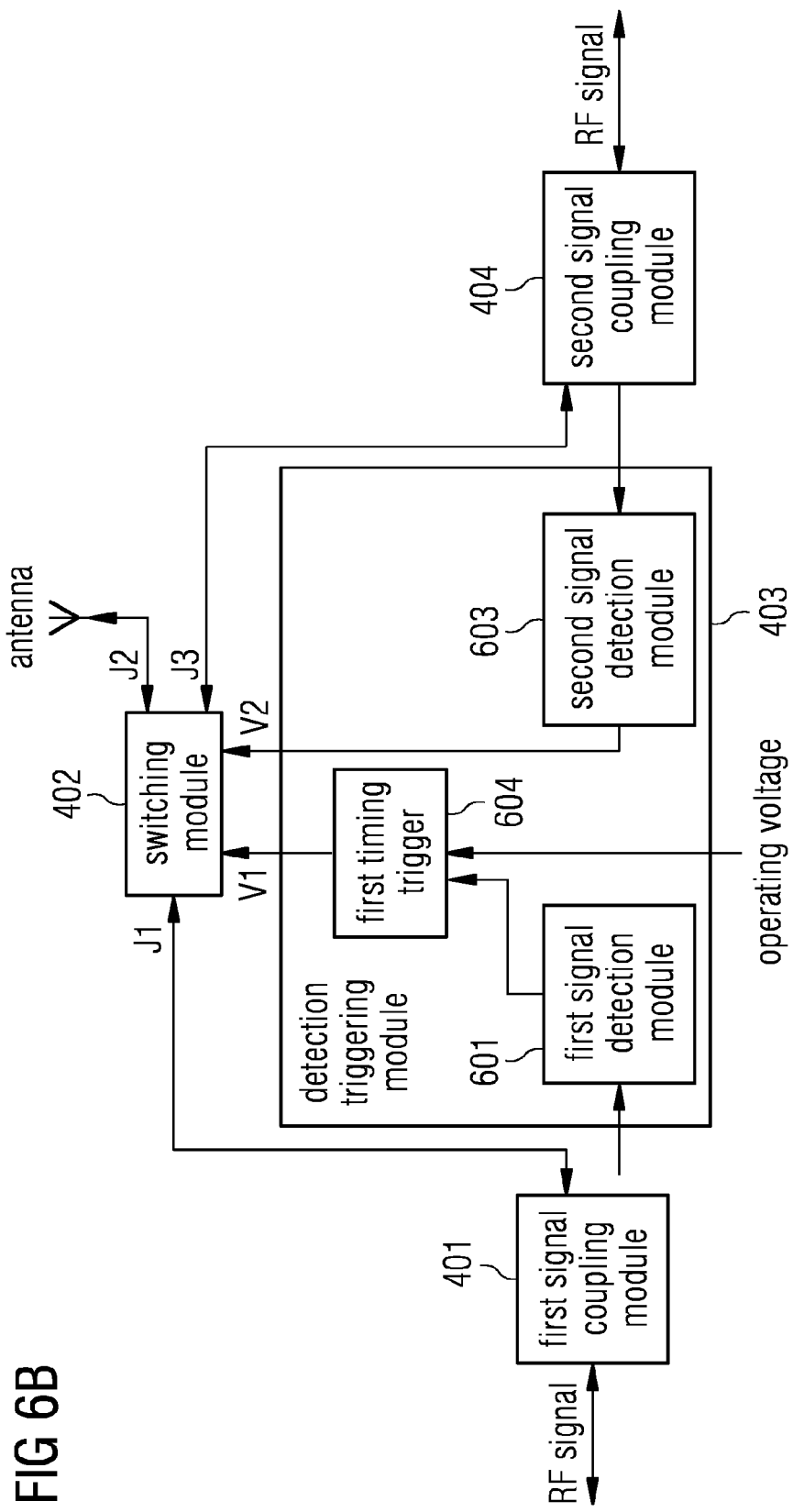

In the antenna switching device shown in FIG. 4B, when the radio frequency communication signal is sent out in a predetermined period or sent out continuously, as shown in FIG. 6B, the detection triggering module 403 can comprise a first signal detection module 601, a second signal detection module 603 and a first timing trigger 604. In present embodiment, the first signal detection module 601 is used for triggering the first timing trigger 604 when detecting an RF signal from the forward link, the first timing trigger 604 is used for starting a first timer when it is triggered by the first signal detection module 601 and outputting a first switching instruction to the switching module 402 when the first timer has timed out, the second signal detection module 603 is used for outputting a second switching instruction to the switching module 402 when detecting a feedback signal from the backward link.

Figure 6C:
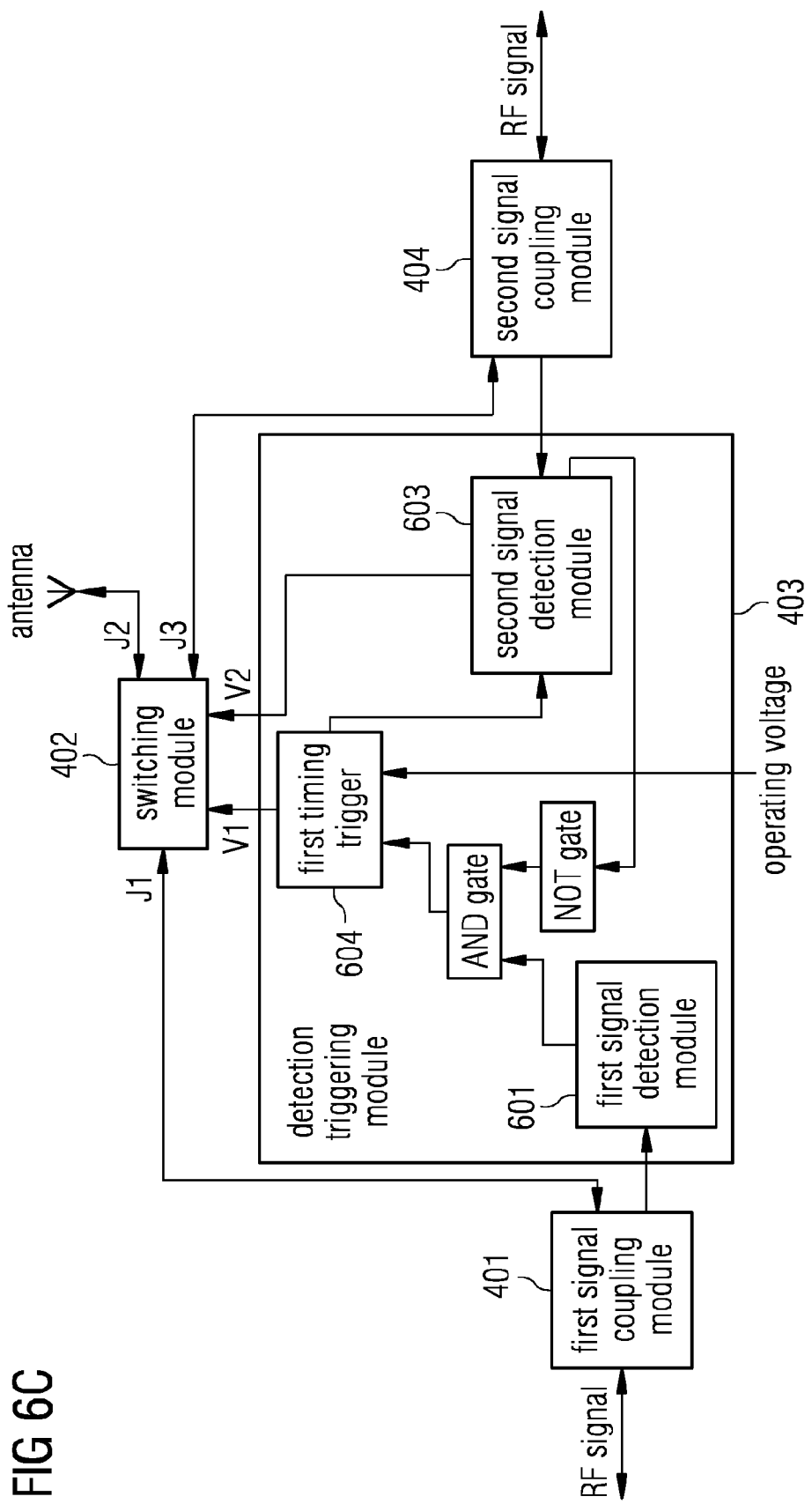

Particularly, the detection triggering module 403 shown in FIG. 6B can be further implemented as a circuit structure shown in FIG. 6C. As shown in FIG. 6C, it is assumed that the initial status of the switching module 402 is that J2 is connected to J1, the default output of the first timing trigger 604 is a low voltage, and the timer counts by the high voltage triggering; and the first signal detection module 601 is used for detecting the voltage value of a forward RF signal and the second signal detection module 602 is used for detecting the voltage value of the feedback signal, with the default outputs of both being low voltages.

The operational principles of this detection triggering module 403 are as follows:

When the first signal detection module 601 detects the forward RF signal as a high voltage, it will trigger the first timing trigger 604 to start the first timer to begin counting (assuming that the initial value of the first timer is T1). After T1 (the first timer having timed out), the first timing trigger 604 controls the switching module 402 via V1 to connect J3 to J1. At the same time, the first timing trigger 604 triggers the second signal detection module to output a high voltage. Within T1, the antenna connected to the switching module 402 can receive the forward RF signal from the previous hop over the forward link and then communicate with a tag. After T1, the switching module 402 will be connected to the antenna switching device of the next hop over the forward link and the reader will then be switched to the antenna connected to the antenna switching device of the next hop.

When all the antennae have been switched for one turn (i.e., the reader has been switched to the antenna of the last hop in the forward link), the switching modules corresponding to all the antennae are set to be connected to a next hop over the forward link, and at this moment, the RF signal will be reflected by a terminator to form a feedback signal. The second signal detection module 602 will be used to detect the voltage of the feedback signal, and if the feedback signal is detected to be a high voltage, then the second signal detection module 602 is changed to output a low voltage. At this moment, the switching module 402 will reset to the initial status. When the first signal detection module 601 detects a high voltage again, the abovementioned switching process will be repeated and then a new run of switching starts.

Optionally, in the antenna switching device shown in FIG. 4B when the radio frequency communication signal is sent out a predetermined period or sent out continuously and when the radio frequency communication signal is sent out in a predetermined period, the detection triggering module 403 can further comprise a first signal detection module, a second signal detection module, a first timing trigger and a control trigger, where the first signal detection module is used for triggering the first timing trigger when detecting the radio frequency communication signal from the forward link, the first timing trigger is used for starting a first timer when it is triggered by the first signal detection module and outputting a first switching instruction to the switching module when the first timer has timed out, the second signal detection module is used for detecting an up edge or a down edge of a feedback signal from the backward link and triggering the control trigger when detecting the up edge or the down edge of the feedback signal, and when the control trigger is used for outputting a second switching instruction to the switching module when it is triggered by the second signal detection module.

In the abovementioned embodiments of these antenna switching devices, when the reader outputs continuous RF signals to communicate with a tag, a preset tag can be built in the antenna to determine at the antenna of which hop the read tag is read, so that the reader can estimate from which antenna the preset tag is read according to the time interval of reading the preset tag and the set parameters of the timer (e.g., T1 and T2).

Further, the abovementioned antenna switching devices can further comprise a path configuration module for accepting a configuration so as to add an antenna switching device into an antenna switching path. In the presents embodiment, the antenna switching path comprises each of the antenna switching devices involved in the sequential switching, and when an antenna switching device is added into this antenna switching path, the abovementioned functions related to the antenna switching of the antenna switching device will be activated, thus enabling the antenna switching device to join the switching process of this antenna switching path.

The detection triggering module 403 (or the control triggers 502 and 602 and the timing triggers 503, 504, and 604 therein) in the antenna switching device provided by the abovementioned embodiments of the present invention needs a certain operating voltage to ensure its normal operation.

This contemplated embodiment of the present invention provides two antenna switching devices employing different ways for supplying the operation voltages: one is an active one and the other is a passive one.

In other contemplated embodiments of the antenna switching device, the antenna switching device is a passive and further comprises a charge pump for receiving a radio frequency communication signal from a previous hop in the forward link and for providing an operating voltage to the detection triggering module.

Figure 7A:
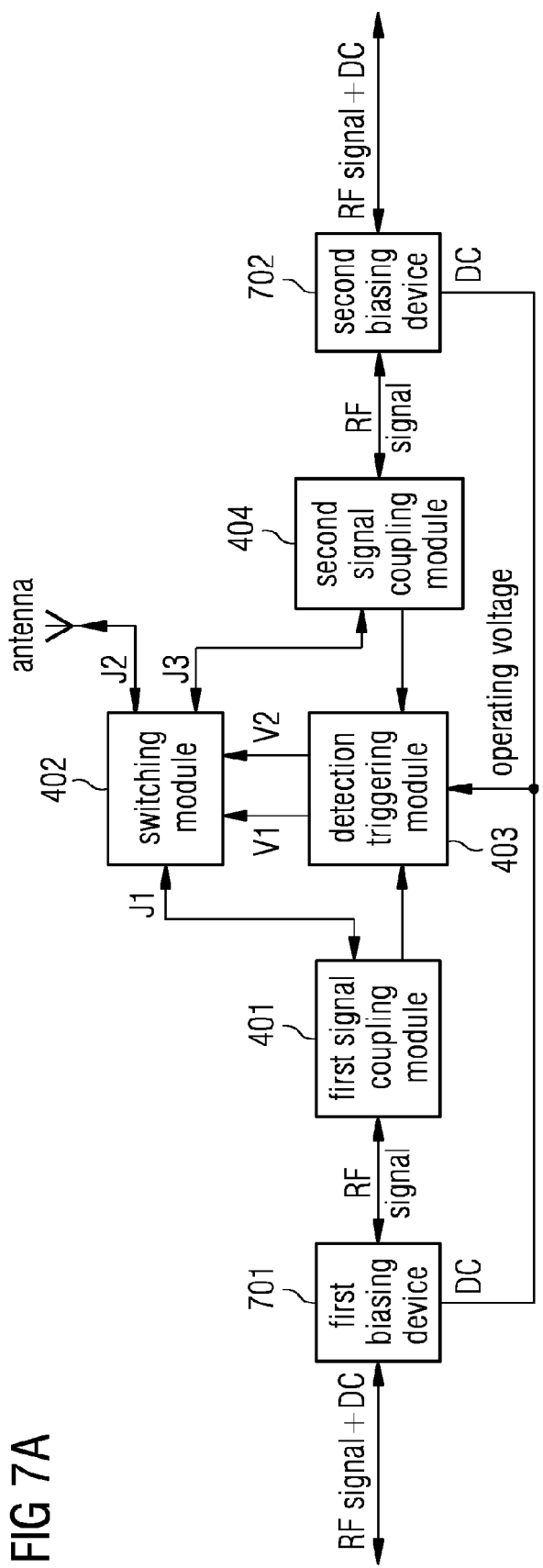

FIG. 7A is a schematic block diagram of the construction and structure of an active antenna switching device in accordance with this embodiment of the present invention. In the present embodiment, the operating voltage of each antenna switching device is provided by a direct-current (DC) power supply provided by the reader via RF cables, and the antenna switching device is as shown in FIG. 4B. As shown in FIG. 7A, the antenna switching device receives an RF signal and a direct current (DC) from the RF cables, and the antenna switching device shown in FIG. 4B needs to add two interconnected biasing devices: a first biasing device 701 and a second biasing device 702. In the present embodiment, the first biasing device 701 splits the RF signal and DC from the RF cables into two routes, with one route being RF signal and the other being DC, where the RF signal is output to the first signal coupling module 401 and DC is output to the detection triggering module 403 (or the control trigger 602 and the timing trigger 604). The first biasing device 701 and the second biasing device 702 are connected to each other. As a result, the second biasing device 702 is able to combine the RF signal from the second signal coupling module 404 and the DC from the first biasing device 701 into one route of signal (RF signal+DC) to transmit over the RF cables.

FIG. 7B is a schematic block diagram of the construction and structure of an active antenna switching device in accordance with an embodiment of the present invention. In the present embodiment, the operating voltage of each antenna switching device is provided by a direct-current (DC) power supply provided by the reader via RF cables, and the antenna switching device employs the implementation as shown in FIG. 4A. As shown in FIG. 7B, the antenna switching device receives an RF signal and a direct-current (DC) from the RF cables, and the antenna switching device shown in FIG. 4A needs to add two interconnected biasing devices, i.e., a first biasing device 701 and a second biasing device 702. In this embodiment, the first biasing device 701 splits the RF signal and DC from the RF cables into two routes, with one route being RF signal and the other being DC, where the RF signal is output to the first signal coupling module 401 and DC is output to the detection triggering module 403 (or the control trigger 502 and the timing triggers 503, 504). The first biasing device 701 and the second biasing device 702 are connected to each other. As a result, the second biasing device 702 is able to combine the RF signal from the switching module 402 and the DC from the first biasing device 701 into one route of signal (RF signal+DC) to transmit over the RF cables.

FIG. 8 is a schematic block diagram of the construction and structure of a passive antenna switching device in accordance with an embodiment of the present invention. In the present embodiment, a charge pump is built in the antenna switching device, and the operating voltage can be automatically provided to the detection triggering module 403 (or the control triggers 502, 602 and the timing triggers 503, 504, 604 therein) depending on the RF signals over the RF cables. As shown in FIG. 8, the antenna switching device receives an RF signal from the RF cables, and this RF signal is also input into a charge pump 801 apart from being input into the first signal coupling module 401, and this charge pump 801 then processes this RF signal so as to provide an operating voltage to the detection triggering module 403. In this embodiment, the antenna switching device employs the implementation shown in FIG. 4B, and when the antenna switching device employs the implementation shown in FIG. 4A, the connection manner and operational principles of the charge pump 801 do not change, which will not be presented in the accompanying drawings. Furthermore, in the abovementioned antenna switching devices, when the first signal detection modules 501 and 601 are used for detecting the down edge or the up edge of a radio frequency communication signal, the first signal detection modules 501 and 601 can comprise an envelope detection module, a differential circuit and a time delay module, where the enveloping detection module is used for obtaining the envelope of the radio frequency communication signal from the first signal coupling module, the differential circuit is used for processing the envelope of the radio frequency communication signal from the envelope detection module so as to detect the down edge or the up edges in the envelope, and the time delay module is used for performing a time delay processing to the output of the differential circuit and then triggering the control trigger. When the second signal detection module 603 is used for detecting the down edge or the up edge of a feedback signal, the second signal detection module 603 can comprise an envelope detection module and a differential circuit, where the envelope detection module is used for obtaining the envelope of the feedback signal from a second signal coupling module, the differential circuit is used for processing the envelope of the feedback signal from the envelope detection module so as to detect the down edge or the up edge in the envelope and then triggering the control trigger, and where the first signal coupling module 401 and the second signal coupling module 404 can be directional couplers, the first biasing device 701 and the second biasing device 702 can be bias tees, and the charge pump 801 can be an AC/DC charge pump.

Figure 10:
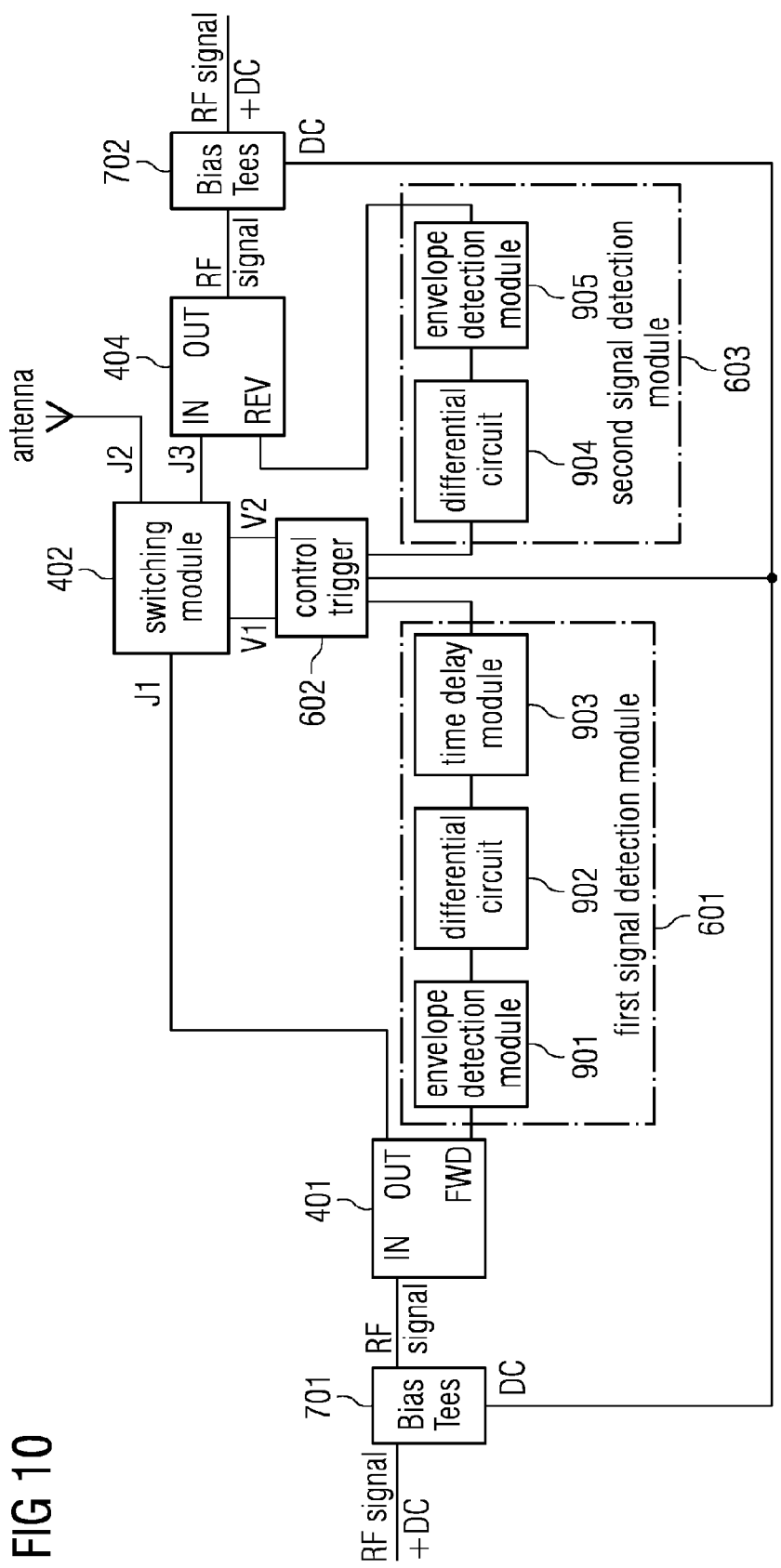
FIG. 10 is a schematic block diagram of the construction and structure of an active antenna switching device according to an embodiment of the present invention.

When employing these particular devices, the structures of the antenna switching device provided by this embodiment of the present invention are as shown in FIGS. 9 and 10.

FIG. 9 is a schematic block diagram of the construction and structure of a passive antenna switching device in accordance with an embodiment of the present invention. As shown in FIG. 9, the first signal detection module 601 comprises an envelope detection module 901, a differential circuit 902 and a time delay module 903, the second signal detection module 603 comprises an envelope detection module 904 and a differential circuit 905, and the first signal coupling module 401 and the second signal coupling module 404 are both directional couplers (a two-directional coupler is employed here) and the charge pump 801 is an AC/DC charge pump. In this case, the envelope detection modules 901 and 905 can obtain the envelope of an RF signal according to an inputted RF signal (such as a radio frequency communication signal or a feedback signal), the differential circuits 902 and 904 can process the envelope from the envelope detection module 901 or 905 so as to detect an up edge or a down edge in this envelope, therefore it can trigger the control trigger 602 when detecting the up edge or the down edge of this envelope, and the time delay module 903 can perform a time delay processing to the processed results from the differential circuit 902.

FIG. 10 is a schematic block diagram of the construction and structure of an active antenna switching device in accordance with an embodiment of the present invention. As shown in FIG. 10, the difference between this active antenna switching device and the passive antenna switching device shown in FIG. 9 is that it comprises a first biasing device 701 and a second biasing device 702, both of which are bias tees, but it does not comprise the AC/DC charge pump 801.

As to the operational principles of the antenna switching devices shown in FIGS. 9 and 10, there are already detailed descriptions in the abovementioned embodiments, which will not be repeated here.

Figure 11:
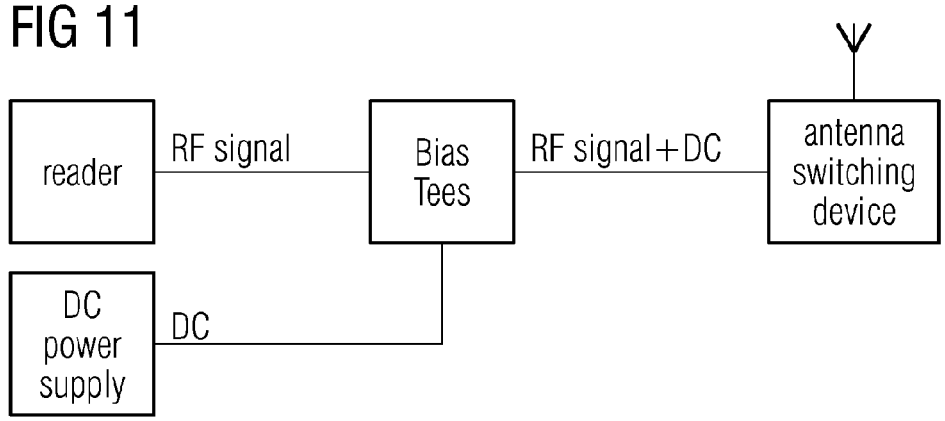
FIG. 11 is a schematic block diagram of a reader providing power supply voltage to an active antenna switching device in accordance with an embodiment of the present invention.

In the active antenna switching device provided by this contemplated embodiment of the present invention, the reader needs to provide a direct-current power supply to the RF cables, and FIG. 11 shows a schematic diagram of a reader providing a power supply voltage to an active antenna switching device in accordance with this embodiment of the present invention. As shown in FIG. 11, the original part of the reader outputs an RF signal to a biasing device (a bias tee is employed here) and the additive DC power supply of the reader also outputs DC to the bias tee, which bias tee combines these two routes of signals into one route of signal (RF signal+DC) to output to the antenna switching device.

In this embodiment of the present invention, the particular implementation of the differential circuit and charge pump employed by the antenna switching device can be implemented in a traditional way and they can also employ other designs, and no restrictions thereto are made in the present invention.

Figure 12:
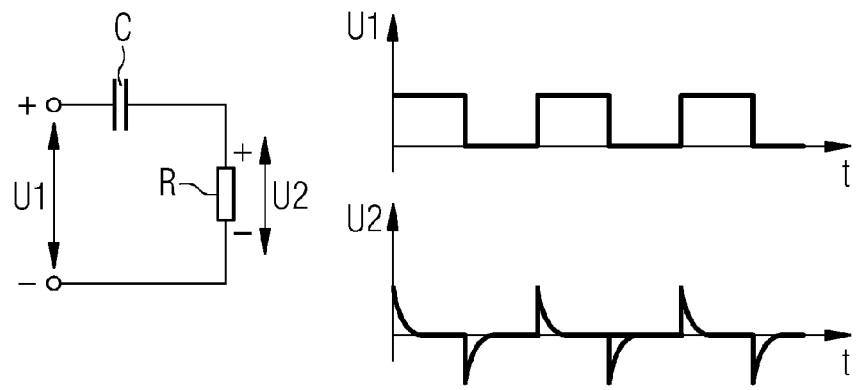
FIG. 12 is a schematic block diagram of a differential circuit employed in an antenna switching device in accordance with an embodiment of the present invention.

FIG. 12 is a schematic block diagram of the differential circuit employed by an antenna switching device according to an embodiment of the present invention. In FIG. 12, it can be seen from the left-hand half of the illustration that U1 is the input voltage of the differential circuit and U2 is the output voltage of the differential circuit, and the relationship between U1 and U2 can be seen from the right-hand half of the illustration: apparently. After having been processed by the differential circuit, the control trigger can be used to detect the up edges or down edges in the envelope.

Figure 13:
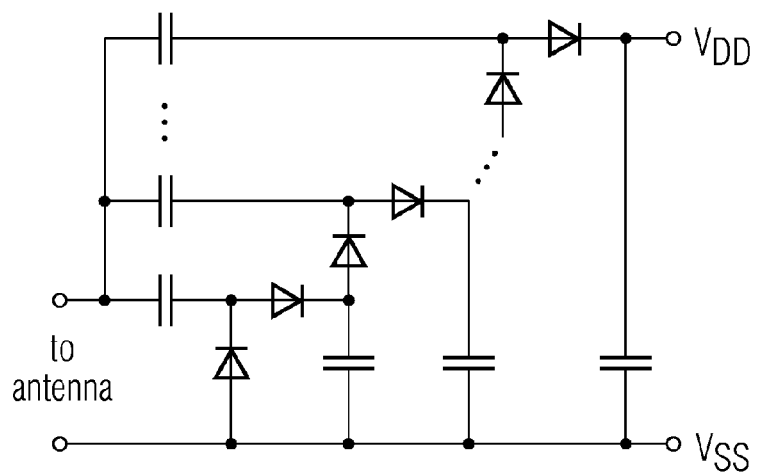
FIG. 13 is a schematic block diagram of an alternating/direct current (AC-DC) charge pump employed in an antenna switching device in accordance with an embodiment of the present invention.

FIG. 13 is a schematic block diagram of an alternating/direct current (AC-DC) charge pump employed by the antenna switching device in accordance with an embodiment of the present invention. It can be seen from FIG. 13 that the alternating/direct current charge pump can output an operating voltage ($V_{dd}$) to the control trigger after having the inputted RF signal processed.

Based on the abovementioned method, system and device for switching an antenna, the contemplated embodiment of the present invention further provides an antenna system in an RFID system, which comprises an antenna and an antenna switching device disposed outside the antenna and an antenna in an RFID system, with an antenna switching device being built in this antenna. Here, this antenna switching device can be any of the abovementioned embodiments, and the operational principles of which will not be described redundantly here.

Based on the abovementioned method, system and device for switching an antenna, this embodiment of the present invention further provides a method for addressing antennae in an RFID system, which method comprises successively switching a reader to some of or all of the antennae in a plurality of antennae according to a radio frequency communication signal from the reader so as to address an antenna therein. For example, if there is a total of four antenna in the system and it needs to address the third antenna, then the reader can be successively switched from the first antenna to the third antenna by sending out a periodical radio frequency communication signal, i.e., addressing the third antenna.

Particularly, the antenna addressing method is as follows: designating an antenna to be addressed by designating the number of periods of the radio frequency communication signal, and switching the reader to the next antenna in each period, and when the radio frequency communication signal sends out a designated number of periods, the antenna to which the reader is switched would be the one to be addressed. For example, if the third antenna is to be addressed, a radio frequency communication signal with two periods can be sent out in succession, then the reader will be switched to the third antenna in the second period, i.e. the third antenna is now addressed.

Particularly, within each sending period, the reader can be switched to the next one of the antennae when detecting a down edge or an up edge of the radio frequency communication signal, and the particular switching principles have been described in detail above, and will not be repeated here.

After having employed the abovementioned embodiments of the present invention, the wiring facilities in the RFID system-based smart shelves system can be greatly simplified, the difficulty in forming a network will be reduced significantly and the workload of the construction workers will also be reduced. Particularly, the number of antennae supported by the antenna switching system provided by embodiments of the present invention depends on the insertion loss of the components in the main link, which comprises a signal coupler (such as a bidirectional coupler IG1304-30, IL=0.25 dB) and a switching module (such as AS193-73LF, IL=0.35 dB). Assuming that the output power is 33 dBm, the total insertion loss would be 0.85 dB, and the required minimum power is 15 dBm, then the number of the antennae supported is about 21. However, as to the networking scheme mentioned in the description of the related art, twenty one (21) antennae means that it would need 4 to 5 switching layers. Apparently, the embodiments of the present invention have considerable technical effects in terms of wiring facilities, costs of implementation, etc.

Furthermore, the embodiments of the present invention do not introduce any change to the software and hardware of the reader. Ordinary antennae can also be used directly in disclosed embodiments of the present invention. The disclosed embodiments of the present invention do not depend on any specific signals over cables to operate. Therefore, it is easy to implement the embodiments of the present invention in combination with existing systems.

Furthermore, the design of a passive antenna switching device provided by the disclosed embodiments of the present invention removes the needs for DC power supply, and when employing such passive antenna switching devices, the costs of the whole system can be further reduced significantly.

What are described above are merely preferred embodiments of the present invention and are not intended to limit the present invention, and any modification, equivalent replacement, improvement, etc. made within the spirit and principles of the present invention shall be covered in the protective scope of the present invention.

While there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for switching an antenna in a radio frequency identification (RFID) system comprising a reader and a plurality of antennae, the method comprising the steps of:
   transmitting a radio frequency communication from the reader; and
   switching the reader in a sequential manner to each antenna of the plurality of antennae successively according to the radio frequency communication signal from the reader;
   wherein the radio frequency communication signal is provided for the reader to communicate with a tag; and
   wherein when the radio frequency communication signal is sent out in a predetermined period, the switching of the reader in the sequential manner to each antenna of the plurality of antennae successively according to the radio frequency communication signal from the reader comprises switching the reader to a next antenna of the plurality of antennae when one of a down edge and an up edge of the radio frequency communication signal is detected; or
   wherein when the radio frequency communication signal is sent out one of in a predetermined period and continuously, the switching of the reader in the sequential manner to each antenna of the plurality of antennae successively according to the radio frequency communication signal from the reader comprises starting, for each antenna of the plurality of antennae, a first timer when the radio frequency communication signal is detected, and switching the reader to a next one of the antennae of the plurality of antennae when the first timer times out.

2. The method as claimed in claim 1, wherein the reader is initially connected to the antenna adjacent thereto; and
   wherein, when the reader is switched to a last antenna, the method further comprises the steps of:
   switching the reader to a terminator adjacent to said last antenna, the terminator reflecting the radio frequency communication signal and forming a feedback signal, and re-switching the reader to an antenna adjacent to the reader according to the feedback signal and continuing switching the reader in the sequential manner to each antenna of the plurality of antennae successively; or
   waiting for a preset time period, and re-switching the reader to the antenna adjacent to the reader and continuing the switching of the reader in the sequential manner to each antenna of the plurality of antennae successively.

3. The method as claimed in claim 2, wherein the re-switching of the reader to the antenna adjacent to the reader according to the feedback signal comprises when the radio frequency communication signal is sent out in the predetermined period, switching the reader to the antenna adjacent thereto at a time when an up edge or a down edge of the feedback signal is detected, or when said feedback signal is detected, switching said reader to the antenna adjacent thereto; or
   wherein said waiting for a preset time period and re-switching the reader to the antenna adjacent to the reader comprises setting, for each antenna of the plurality of antennae, a second timer, and starting the second timer after detection of the radio frequency communication signal, and re-switching the reader to the antenna adjacent thereto, triggered by the successive timeout of the second timer of each of the antennae.

4. The method as claimed in claim 1, further comprising the step of:
   configuring an antenna switching path,
   wherein the antenna switching path includes a plurality of antennae involved in the sequential switching and the plurality of antenna included in the antenna switching path include some of or all of the antennae in said system.

5. A device for switching an antenna in a radio frequency identification (RFID) system, comprising:
   a reader; and
   a plurality of antennae corresponding to a respective antenna switching device connectable sequentially to said reader;
   wherein the antenna switching device comprises:
   a first signal coupling module;
   a detection triggering module; and
   a switching module;
   wherein, an initial status of the switching module is connection to its respective antenna and disconnection from a next hop in a forward link which is provided in a direction from the reader to the antenna switching device;
   wherein said first signal coupling module receives a radio frequency communication signal from a previous hop over the forward link and outputs the radio frequency communication signal to the detection triggering module and the switching module;
   wherein the radio frequency communication signal is provided for the reader to communicate with a tag;
   wherein the detection triggering module outputs a first switching instruction to the switching module according to the radio frequency communication signal; and
   wherein the switching module disconnects from its respective antenna after having received the first switching instruction, connects to the next hop in the forward link, and outputs the radio frequency communication signal to the next hop in the forward link.

6. The antenna switching device as claimed in claim 5, wherein when the radio frequency communication signal is sent out in a predetermined period, the detection triggering module comprises a first signal detection module and a control trigger, the first signal detection module detecting a down edge or an up edge of the radio frequency communication signal and triggering the control trigger when the down edge or the up edge of the radio frequency communication signal is detected, and the control trigger sending the first switching instruction to the switching module when triggered by the first signal detection module; or
   wherein when said radio frequency communication signal is sent out one of in the predetermined period and continuously, the detection triggering module comprises the first signal detection module and a first timing trigger, the first signal detection module triggering the first timing trigger when the radio frequency communication signal from the forward link is detected, and the first timing trigger starting a first timer when triggered by the first signal detection module and outputting the first switching instruction to the switching module when the first timer times out.

7. The antenna switching device as claimed in claim 6, wherein the detection triggering module further comprises a second timing trigger;
   wherein the first signal detection module additionally triggers the second timing trigger when a radio frequency communication signal from the forward link is detected;
   wherein the second timing trigger additionally starts a second timer when triggered by the first signal detection module and outputs a second switching instruction to the switching module when the second timer times out; and wherein the switching module additionally resets the initial status upon receiving the second switching instruction.

8. The antenna switching device as claimed in claim 5, wherein the detection triggering module further comprises a first signal detection module, a first timing trigger and a second timing trigger;
   wherein the first signal detection module triggers the first timing trigger when a radio frequency communication signal from the forward link is detected,
   wherein the first timing trigger starts a first timer when triggered by the first signal detection module, and outputs the first switching instruction to the switching module and triggers a second timer when the first timer times out;
   wherein the second timing trigger starts the second timer when triggered by the first timing trigger, and outputs a second switching instruction to the switching module when the second timer times out; and
   wherein the switching module additionally resets to the initial status upon receiving the second switching instruction.

9. The antenna switching device as claimed in claim 5, further comprising:
   a second signal coupling module;
   wherein the second signal coupling module receives a feedback signal from a previous hop over a backward link and outputs the feedback signal from the previous hop to the detection triggering module and said switching module;
   wherein the feedback signal is formed by a terminator reflecting the radio frequency communication signal and the backward link is provided in a direction from the terminator to the antenna switching device;
   wherein the detection triggering module outputs a second switching instruction to the switching module according to the feedback signal;
   wherein the switching module outputs the radio frequency communication signal to a next hop in the forward link via the second signal coupling module, and additionally outputs the feedback signal to the first signal coupling module, and connects to its respective antenna and disconnects from the second signal coupling module upon receiving the second switching instruction; and
   wherein the first signal coupling module additionally outputs the feedback signal to a next hop in the backward link.

10. The antenna switching device as claimed in claim 9, wherein when the radio frequency communication signal is sent out in a predetermined period, the detection triggering module comprises a first signal detection module, a second signal detection module and a control trigger, the first signal detection module detecting a down edge or an up edge of the radio frequency communication signal and triggering the control trigger when the down edge or the up edge of the radio frequency communication signal is detected, the second signal detection module detecting an up edge or a down edge of a feedback signal from the backward link and triggering the control trigger when the up edge or the down edge of the feedback signal is detected, or the second signal detection module triggering the control trigger when the feedback signal from the backward link is detected or outputting directly the second switching instruction to the switching module, and the control trigger sending the first switching instruction to the switching module when triggered by the first signal detection module and sending the second switching instruction to the switching module when triggered by the second signal detection module; or
   wherein when the radio frequency communication signal is sent out one of in a predetermined period and sent out continuously, the detection triggering module comprises a first signal detection module, a second signal detection module and a first timing trigger, the first signal detection module triggering the first timing trigger when a radio frequency communication signal from the forward link is detected, the first timing trigger starting a first timer when triggered by the first signal detection module and outputting the first switching instruction to the switching module when said first timer times out, and the second signal detection module outputting the second switching instruction to the switching module when a feedback signal from the backward link is detected.

11. The antenna switching device as claimed in claim 5, wherein the antenna switching device comprises a first biasing device and a second biasing device connected with each other when the antenna switching device is active;
   wherein the first biasing device receives a radio frequency communication signal and a direct current (DC) from a previous hop over the forward link, outputs the radio frequency communication signal to the first signal coupling module, and outputs the DC to the detection triggering module and the second biasing device, and the second biasing device receives a radio frequency communication signal from the switching module and the DC from the first biasing device, and combines the radio frequency communication signal and the DC as a signal route and output the signal route to a next hop in the forward link; or
   wherein the antenna switching device further comprises a charge pump when the antenna switching device is passive for receiving a radio frequency communication signal from a previous hop in the forward link and for providing an operating voltage to the detection triggering module.

12. The antenna switching device as claimed in claim 9, wherein the antenna switching device further comprises a first biasing device and a second biasing device connected with each other when the antenna switching device is active;
   wherein said first biasing device receives a radio frequency communication signal and a direct current (DC) from a previous hop over the forward link, outputs the radio frequency communication signal to the first signal coupling module, and outputs the DC to the detection triggering module and the second biasing device, and the second biasing device receives a radio frequency communication signal from the switching module and the DC from the first biasing device, and combines the radio frequency communication signal and the DC as a signal route and outputs the signal route to a next hop in the forward link; or
   wherein the antenna switching device further comprises a charge pump when the antenna switching device is passive for receiving a radio frequency communication signal from a previous hop in the forward link and for providing an operating voltage to the detection triggering module.

13. The antenna switching device as claimed in claim 10, wherein the antenna switching device further comprises a first biasing device and a second biasing device connected with each other when the antenna switching device is active;
   wherein said first biasing device receives a radio frequency communication signal and a direct current (DC) from a previous hop over the forward link, outputs the radio frequency communication signal to the first signal coupling module, and outputs the DC to the detection triggering module and the second biasing device, and the second biasing device receives a radio frequency communication signal from the switching module and the DC from the first biasing device, and combines the radio frequency communication signal and the DC as a signal route and outputs the signal route to a next hop in the forward link; or wherein the antenna switching device further comprises a charge pump when the antenna switching device is passive for receiving a radio frequency communication signal from a previous hop in the forward link and for providing an operating voltage to the detection triggering module.

14. The antenna switching device as claimed in claim 5, further comprising a path configuration module for accepting a configuration so as to add the antenna switching device into an antenna switching path comprising antenna switching devices involved in sequential switching.

15. A system for switching an antenna in a radio frequency identification (RFID) system, comprising:
   a reader; and
   a plurality of antennae;
   wherein each antenna of the plurality of antennae corresponds to a respective antenna switching device, and the plurality of antenna switching devices are sequentially connected to the reader, an initial status of each antenna of the plurality of antenna switching devices being connected to its respective antenna and disconnected from a next hop in a forward link; and
   wherein the respective antenna switching device receiving a radio frequency communication signal from a previous hop over the forward link, disconnecting from its respective antenna and connecting to a next hop in the forward link according to the radio frequency communication signal, and outputting the radio frequency communication signal to the next hop in the forward link;
   wherein the radio frequency communication signal is provided for the reader to communicate with a tag, and the forward link is provided in a direction from the reader to the antenna switching device;
   wherein the antenna switching device additionally waits for a preset time period and then resets to an initial status after having disconnected from its respective antenna; or
   wherein the system further comprises a terminator, which connects to the antenna switching device of the last hop over said forward link, and said terminator reflects a radio frequency communication signal from a previous hop over the forward link and forms a feedback signal transmitted to a next hop in a backward link; and
   wherein the backward link is provided in a direction from the terminator to the antenna switching device, the antenna switching device additionally receiving a feedback signal from a previous hop over the backward link, connecting to its respective antenna and disconnecting from the previous hop over the backward link according to the feedback signal, and outputs the feedback signal to the next hop in the backward link.

16. An antenna system in a radio frequency identification (RFID) system, the antenna system comprising:
   an antenna; and
   an antenna switching device comprising:
      a first signal coupling module;
      a detection triggering module; and
      a switching module;
   wherein, an initial status of the switching module is connection to its respective antenna and disconnection from a next hop in a forward link which is provided in a direction from the reader to the antenna switching device;
   wherein said first signal coupling module receives a radio frequency communication signal from a previous hop over the forward link and outputs the radio frequency communication signal to the detection triggering module and the switching module;
   wherein the radio frequency communication signal is provided for the reader to communicate with a tag;
   wherein the detection triggering module outputs a first switching instruction to the switching module according to the radio frequency communication signal;
   wherein the switching module disconnects from its respective antenna after having received the first switching instruction, connects to the next hop in the forward link, and outputs the radio frequency communication signal to the next hop in the forward link;
   wherein the antenna switching device waits for a preset time period and then resets to the initial status after having disconnected from the respective antenna; or
   wherein the system further comprises a terminator, which connects to the antenna switching device after the last hop over said forward link, and said terminator reflects a radio frequency communication signal from a previous hop over the forward link and forms a feedback signal transmitted to a next hop in a backward link; and
   wherein the backward link is provided in a direction from the terminator to the antenna switching device, the antenna switching device additionally receiving a feedback signal from a previous hop over the backward link, connecting to the antenna and disconnecting from the previous hop over the backward link according to the feedback signal, and outputs the feedback signal to the next hop in the backward link.

17. An antenna in a radio frequency identification (RFID) system, wherein an antenna switching device as claimed in claim 5 is built into the antenna.

18. A method for addressing antennae in a radio frequency identification (RFID) system comprising a reader and a plurality of antennae, the method comprising the steps of:
   transmitting a radio frequency communication from the reader; and
   switching in a sequential manner the reader successively to some of or all of the antennae in the plurality of antennae according to a radio frequency communication signal sent out in a predetermined period so as to address an antenna of the plurality of antennae therein;
   wherein said radio frequency communication signal is provided for the reader to communicate with a tag; and
   wherein when the radio frequency communication signal is sent out in a predetermined period, the switching of the reader in the sequential manner to each antenna of the plurality of antennae successively according to the radio frequency communication signal from the reader comprises switching the reader to a next antenna of the plurality of antennae when one of a down edge and an up edge of the radio frequency communication signal is detected; or
   wherein when the radio frequency communication signal is sent out one of in a predetermined period and continuously, the switching of the reader in the sequential manner to each antenna of the plurality of antennae successively according to the radio frequency communication signal from the reader comprises starting, for each antenna of the plurality of antennae, a first timer when the radio frequency communication signal is detected, and switching the reader to a next one of the antennae of the plurality of antennae when the first timer times out.

19. The method as claimed in claim 18, wherein the switching in the sequential manner of the reader successively to some of or all of the antennae in the plurality of antennae according to the radio frequency communication signal sent out in the predetermined period so as to address one of the antennae therein comprises designating the antenna of the plurality of antennae to be addressed by designating a number of periods during which the radio frequency communication signal is sent out;

switching the reader to a next antenna of the plurality of antennae during each period; and switching the reader to the antenna which is the antenna of the plurality of antennae to be addressed when the radio frequency communication signal is sent out for the designated number of periods.

\* \* \* \* \*